(12) United States Patent
Mongeau et al.

(10) Patent No.: US 12,176,757 B2
(45) Date of Patent: Dec. 24, 2024

(54) MOUNTING OF STATORS IN GENERATORS FOR WIND TURBINES

(71) Applicant: Vestas Wind Systems A/S, Aarhus N. (DK)

(72) Inventors: Peter Mongeau, Center Conway, NH (US); Henrik Zaar Mannik, Thorsø (DK); Lars Langvardt Krogh, Egå (DK)

(73) Assignee: Vestas Wind Systems A/S, Aarhus N. (DK)

( * ) Notice: Subject to any disclaimer, the term of this patent is extended or adjusted under 35 U.S.C. 154(b) by 471 days.

(21) Appl. No.: 17/619,405

(22) PCT Filed: Jun. 24, 2020

(86) PCT No.: PCT/DK2020/050187
§ 371 (c)(1),
(2) Date: Dec. 15, 2021

(87) PCT Pub. No.: WO2020/259778
PCT Pub. Date: Dec. 30, 2020

(65) Prior Publication Data
US 2022/0263359 A1  Aug. 18, 2022

Related U.S. Application Data

(60) Provisional application No. 62/868,118, filed on Jun. 28, 2019.

(30) Foreign Application Priority Data

Aug. 12, 2019 (DK) ............................ PA 2019 70512

(51) Int. Cl.
*H02K 1/18* (2006.01)
*H02K 7/18* (2006.01)
(Continued)

(52) U.S. Cl.
CPC ............ *H02K 1/185* (2013.01); *H02K 7/1838* (2013.01); *H02K 15/0006* (2013.01); *H02K 15/028* (2013.01); *H02K 2213/09* (2013.01)

(58) Field of Classification Search
CPC ...... H02K 15/028; H02K 17/42; H02K 1/185; H02K 7/1823
See application file for complete search history.

(56) References Cited

U.S. PATENT DOCUMENTS 3,988,622 A * 10/1976 Starcevic ............. H02K 15/028
310/216.127
9,257,873 B2 * 2/2016 Vitello ................. H02K 15/024
(Continued)

FOREIGN PATENT DOCUMENTS

CN 102204063 A 9/2011
CN 104979923 A 10/2015
(Continued)

OTHER PUBLICATIONS

Danish Patent and Trademark Office, Search and Examination Report in PA 2019 70512, Feb. 4, 2020.
(Continued)

*Primary Examiner* — Leda T Pham
(74) *Attorney, Agent, or Firm* — Wood Herron & Evans LLP

(57) ABSTRACT

A stator mount and a tool for adjusting the position of a stator mount of a stator of a generator of a wind turbine. The stator mount comprises a support member having a plurality of elongate both holes which provide adjustability between the stator mount and the frame of a generator housing, or between separate components of the stator mount itself. The stator mount may comprise one or more adjustment devices for adjusting the position of the stator mount in use. A tool is provided which may be used to adjust the position of the stator mounts. The tool attaches to the frame of the generator
(Continued)

and comprises one or more adjustment devices for adjusting the position of the stator in use.

19 Claims, 17 Drawing Sheets

(51) Int. Cl.
    *H02K 15/00*     (2006.01)
    *H02K 15/02*     (2006.01)

(56) References Cited

U.S. PATENT DOCUMENTS

| | | | | |
|---|---|---|---|---|
| 9,509,182 | B2* | 11/2016 | Yamarthi | H02K 1/185 |
| 9,854,733 | B1* | 1/2018 | Kile | A01C 5/062 |
| 2005/0235480 | A1 | 10/2005 | Majernik et al. | |
| 2010/0123318 | A1 | 5/2010 | Casazza et al. | |
| 2010/0253087 | A1 | 10/2010 | Auke | |
| 2014/0190001 | A1* | 7/2014 | Jaszcar | H02K 15/024 |
| | | | | 29/596 |
| 2014/0230216 | A1* | 8/2014 | Vitello | H02K 15/0006 |
| | | | | 29/762 |

FOREIGN PATENT DOCUMENTS

| | | | |
|---|---|---|---|
| CN | 206422668 | U | 8/2017 |
| CN | 109751193 | A | 5/2019 |
| EP | 3499029 | A1 | 6/2019 |
| GB | 1115818 | A | 5/1968 |
| WO | 2012159108 | A2 | 11/2012 |
| WO | 2014126792 | A2 | 8/2014 |

OTHER PUBLICATIONS

European Patent Office, International Search Report and Written Opinion in PCT Application No. PCT/DK2020/050187, Sep. 17, 2020.
China National Intellectual Property Administraton. office action issued in corresponding CN Application No. 202080055225.0, dated Jan. 29, 2024, with English translation.
Intellectual Property India, examination report issued in corresponding IN Application No. 202217003491, dated Jan. 30, 2024 with English translation.
European Patent Office, examination report issued in corresponing EP Application No. 20740537.4, dated Apr. 18, 2024.

\* cited by examiner

MOUNTING OF STATORS IN GENERATORS FOR WIND TURBINES

TECHNICAL FIELD

The present invention relates generally to a generator for a wind turbine and more specifically to apparatus for adjusting the mounting position of a stator of the generator.

BACKGROUND

Modern commercial-scale wind turbines comprise a generator to produce electricity from wind power. Amongst other sub-assemblies, the generator of a wind turbine typically comprises a stator mounted to a support frame or generator housing, and a rotor mounted on and driven by an output shaft of a gearbox. The field windings are formed of densely packed coils of a conductive material such as copper and as such the stator has a significant mass and must be supported accordingly.

In a typical generator for a wind turbine, a rotor includes a plurality of ring-shaped rotor laminations or magnet packages that are coaxially arranged into a cylindrical structure. The rotor rotates within a stator around a rotational axis. The magnetic flux generated by the rotor interacts with the windings of the stator to induce electrical current. In order to maximise efficiency, the air gap between the radially outer surface of the rotor and the radially inner surface of the stator should be as small as possible to minimise reluctance and flux leakage. However, the air gap must be set to allow sufficient clearance between the rotor and the stator so that these components do not come into contact whilst the rotor rotates.

To ensure optimised and symmetric electrical power generation it is critical to ensure that the rotor is well centred within the stator and that the air gap between the rotor and stator is symmetrical. In existing generators it is typical to rely on manufacturing and assembly tolerances to achieve this. This is a particular challenge for generators which have the rotor mounted on, and supported only by, the gearbox output shaft as the relative position of the rotor with respect to the stator is reliant on the position the gearbox output shaft and its bearings. Hence, an optimised stator position in the factory, when the rotor is mounted on jig bearings, will not necessarily correspond to an optimised stator position in use when the rotor is mounted on the gearbox output shaft. This problem is compounded by gravitational sag which causes the stator to have a slightly off-circular cross-section.

It is against this background that the present invention has been developed.

SUMMARY OF THE INVENTION

According to a first aspect of the invention, there is provided a stator mount for mounting a stator of a generator to a frame of the generator, the stator mount comprising a support member and a mounting member removably attached to the support member, wherein the support member comprises a beam having a first end and a second end, wherein the beam comprises: a first plurality of openings located in a first end region of the beam proximate the first end of the beam; a second plurality of openings located in a second end region of the beam proximate the second end of the beam; and a third plurality of openings located between the first and second end regions of the beam, wherein either at least the first and second plurality of openings have an elongate form, or at least the third plurality of openings have an elongate form.

The provision of bolt holes having an elongate form allow for the adjustment of the stator mounts, and hence the stator, when they are in situ, mounted within a generator.

The support member may comprise a resilient material.

Optionally the support member comprises a position adjustment device to facilitate the adjustment of the position of the stator of the generator relative to the frame of the generator in use, wherein the position adjustment device comprises an adjustable member configured for movement with respect to the support member and configured for engagement with the frame of the generator in use, wherein the adjustment device is configured so that, in use, movement of the adjustable member relative to the support member causes relative movement between the support member and the frame of the generator.

The adjustment device may comprise a connection member, wherein the connection member is configured to operatively connect the adjustable member and the support member.

Optionally, the support member may comprise a first adjustment device located proximate the first end of the beam, and a second adjustment device located proximate the second end of the beam to facilitate adjustments at either end of the beam.

In another aspect, the present invention provides a generator for a wind turbine, the generator comprising a stator which defines a central axis of the generator, the stator being mounted within a frame by a stator mounting system, wherein the stator mounting system comprises a plurality of stator mounts as described above, each stator mount being removably attached to the stator and removably attached to the frame, wherein the stator mounting system is arranged so that the position of one or more of the stator mounts can be adjusted with respect to the frame with the stator mounted in situ within the frame.

In a further aspect, the present invention provides a method of adjusting the position of the stator of a generator as described above with respect to the frame of the generator when the stator is mounted in-situ within the frame, the method comprising: loosening a first plurality of fasteners, wherein the first plurality of fasteners are associated with one or more of the first plurality of openings, the second plurality of openings, or the third plurality of openings of the support member of a stator mount; moving the adjustable member of the adjustment device of the stator mount to cause relative movement between the stator and the frame of the generator; and tightening the first plurality of fasteners.

Optionally the method comprises loosening a second plurality of fasteners before movement of the adjustable member, wherein the first plurality of fasteners are associated with the first plurality of openings, and the second plurality of fasteners are associated with the second plurality of openings; and tightening the second plurality of fasteners.

The first plurality of fasteners may optionally be associated with the third plurality of openings (74).

In yet another aspect, the present invention provides a tool for adjusting the position of a stator of a generator when the stator is mounted, in-situ, within a frame of the generator, the tool comprising: a first element configured for removable attachment to the frame of the generator; and a second element configured for engagement with the stator of the generator, wherein the second element is moveable with respect to the first element, and wherein the tool is configured so that, in use, when the first element is attached to the frame of the generator and the second element is in engagement with the stator of the generator, movement of the second element relative to the first element causes movement of the stator with respect to the frame.

The second element may optionally be configured to abut the stator in use. Alternatively or additionally, the second element may be configured for removable attachment to the stator in use.

The tool may comprises a third element, wherein the third element is moveable relative to the first element in a first direction, and moveable relative to the second element in a second direction, wherein the tool is configured so that, in use, movement of the third element relative to the first element in the first direction causes movement of the stator along the first direction, and movement of the third element relative to the second element in the second direction causes movement of the stator along the second direction.

The tool may comprise a first adjustment device and a second adjustment device, wherein: the first adjustment device comprises a first adjustment member in operative engagement with the first element and the third element, wherein the first adjustment device is configured so that, in use, adjustment of the first adjustment member causes relative movement between the first element and the third element in the first direction; and the second adjustment device comprises a second adjustment member in operative engagement with the third element and the second element, wherein the second adjustment device is configured so that, in use, adjustment of the second adjustment member causes relative movement between the third element and the second element in the second direction.

The first and/or second adjustment member may optionally be a pulling bolt or a jacking bolt.

Optionally, the first and/or second adjustment member may be actuated by a mechanical handle, a hydraulic actuator or an electrical actuator.

The third element may be constrained to slide relative to the first element by a first pair of rails, and/or constrained to slide relative to the second element by a second pair of rails.

In a further aspect, the present invention provides a method of adjusting the position of the stator of a generator with respect to the frame of the generator when the stator is mounted in-situ within the frame, wherein the stator is mounted within the frame by a stator mounting system comprising a plurality of stator mounts as described above, each stator mount being removably attached to the stator and removably attached to the frame, the method comprising: providing a tool as described above, wherein the tool is attached to the frame of the generator, or wherein the method comprises the step of attaching the tool to the frame of the generator; loosening a plurality of fasteners, wherein the plurality of fasteners are associated with one or more of the first plurality of openings, the second plurality of openings, or the third plurality of openings of the support member of a stator mount; moving the adjustable member of an adjustment device of the tool to cause relative movement between the stator and the frame of the generator; and tightening the plurality of fasteners.

In a yet further aspect, the present invention provides a generator for a wind turbine as described hereinabove, wherein the generator comprises a tool as described above attached to the frame of the generator.

In another aspect, the present invention provides a wind turbine comprising a generator as described hereinabove.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which:

FIG. 17b is a schematic plan view of the alternative stator mount of FIG. 17a.

Note that features that are the same or similar in different drawings are denoted by like reference signs.

SPECIFIC DESCRIPTION

A specific embodiment of the present invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
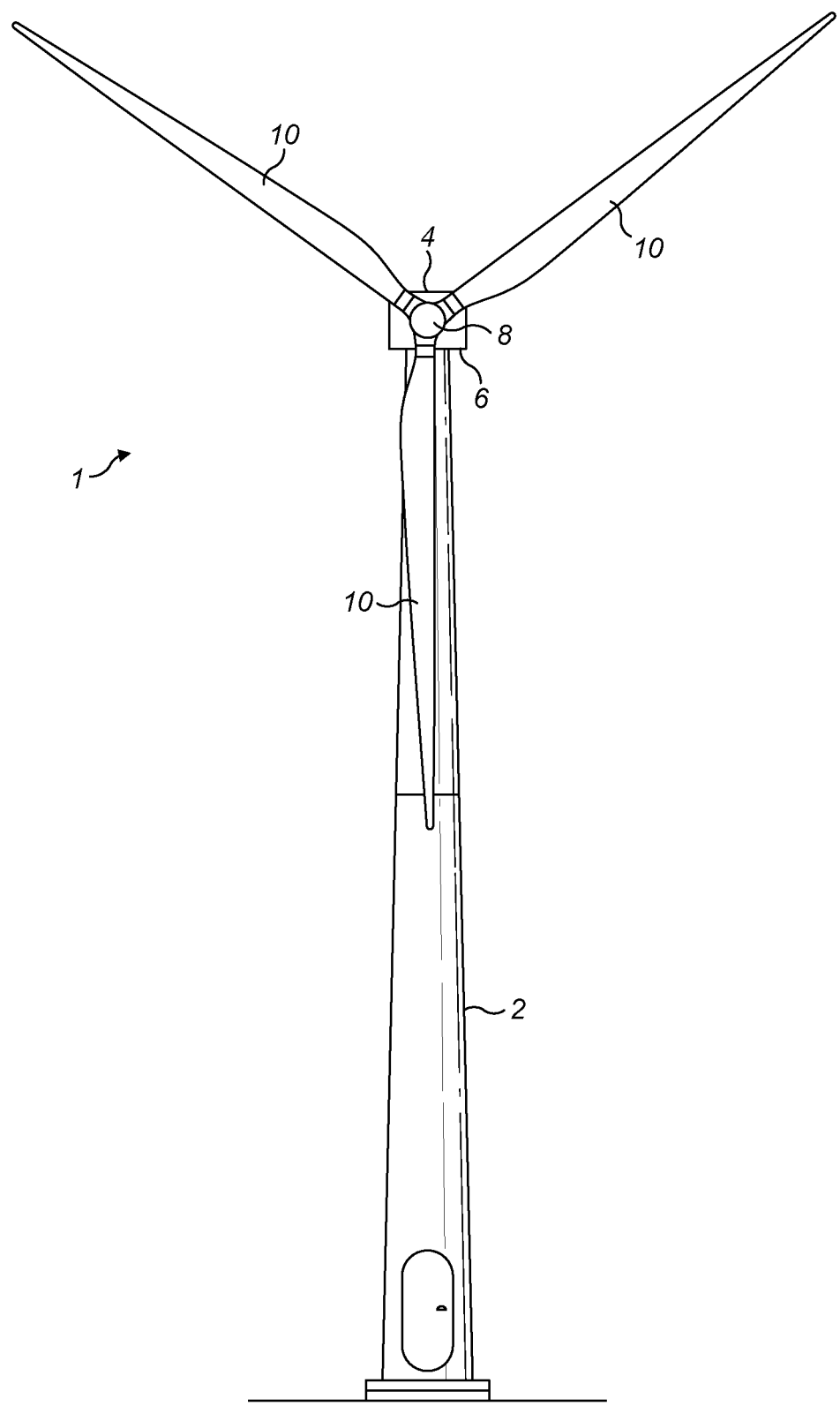
FIG. 1 is a schematic plan view of a horizontal axis wind turbine.
Figure 2:
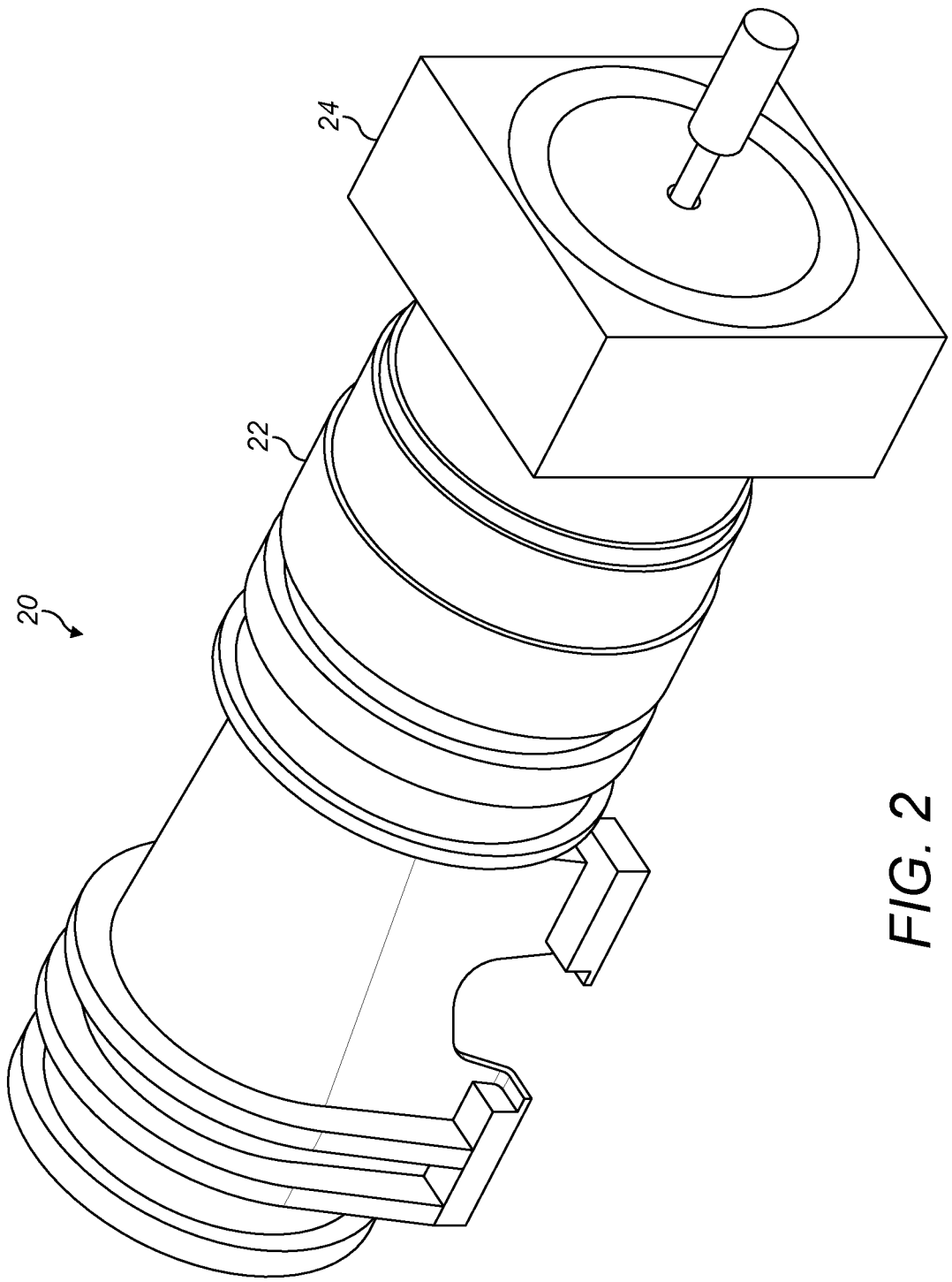
FIG. 2 is a schematic perspective view of functional components of a nacelle of the wind turbine.

In order to place the embodiments of the invention in a suitable context, reference will firstly be made to FIG. 1, which illustrates a typical Horizontal Axis Wind Turbine (HAWT) 1. Although this particular image depicts an on-shore wind turbine, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 1 comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8. The nacelle 4 and rotor blades 10 are turned and directed into the wind direction by the yaw system 6.

The nacelle 4 houses the functional components of the wind turbine, including, for example, a shaft housing 20, a gearbox 22 and a generator 24. A main shaft extends through the shaft housing 20, and is supported on bearings (not shown). The main shaft is connected to, and driven by, the hub 8 and provides input drive to the gearbox 22. The gearbox 22 steps up the rotational speed of the low speed main shaft via internal gears (not shown) and drives a gearbox output shaft. The gearbox output shaft in turn drives the generator 24, which converts the rotation of the gearbox output shaft into electricity. The electricity generated by the generator 24 may then be converted by other components (not shown) as required before being supplied to an appropriate consumer. So-called "direct drive" wind turbines that do not use gearboxes are also known. The gearbox may therefore be considered optional.

The gearbox 22 and generator 24 may be coupled together in an integrated unit. The generator 24 and the gearbox 22 are separate sub-assemblies that themselves have been coupled together to create a single assembly that is comparatively compact.

With reference firstly to the gearbox 22, a gearbox housing 30 is generally cylindrical in form and is oriented such that its major rotational axis is horizontal, in the orientation of the drawings. The cylindrical configuration of the gearbox housing 30 is due to the specific type of gearbox that is used in the illustrated embodiment, which is an epicyclic gearbox. As the skilled person would know, an epicyclic gearbox comprises a series of planet gears that are arranged about a central sun gear, and which collectively are arranged within an encircling ring gear. The ratio of the number of teeth between the ring gear, the planet gear and the sun gears determines the gear ratio of the gearbox. For clarity, fine detail of the gearbox will not be described in further detail here as the gearbox is not the principal subject of the invention. Suffice to say that other gearbox configurations could also be used, although it is currently envisaged that an epicyclic gearbox provides an elegant solution fit for the confines of a wind turbine nacelle.

Turning now to the generator 24, the output shaft of the gearbox 22 interfaces with a rotor 32 of the generator 24. As such, the major axis of the gearbox output shaft defines the rotational axis of the generator 24 which corresponds to the central axis of the stator 36. The stator 36 therefore also defines the central axis of the generator.

The generator 24 in the illustrated embodiment is an IPM (interior permanent magnet) electric machine having an external stator 36 (FIG. 3) which surrounds the rotor 32. An air gap 80 is defined between the radially outward surface 33 of the rotor 32 and the radially inward surface 37 of the stator 36.

The stator 36 comprises a core 27 which is made up of a plurality of ring-shaped laminations 35 that are coaxially arranged in a cylindrical structure that defines a cylindrical interior volume of the stator. The stator laminations 35 are axially spaced from one another such that slot-like stator apertures 24 are defined by the respective axial spacing between neighbouring stator laminations 35. Field windings 26 of a conductive material such as copper are supported in circumferentially spaced arrangement by the laminations 35 of the stator core.

In use, an electrical current is induced in the field windings 26 by a fluctuating magnetic field caused by the magnets of the rotor 32 which is rotated by the hub 8 of the wind turbine 1. Although the example described herein refers to an interior permanent magnet machine, it will be appreciated that in other examples the generator may comprise a rotor 32 having an electro-magnet instead of permanent magnets.

The generator 24 comprises a frame 40 within which the stator 36 is mounted by a stator mounting system. The frame 40 has drive end face 46 located, in use, adjacent to the gearbox 22, and a non-drive end face 45 located opposite the drive end face 46 and separated therefrom in the direction of the central generator axis. A first axial end 28 of the stator 36 is located adjacent the drive end 46 of the frame 40, and a second axial end 29 of the stator 36 is located adjacent the non-drive end 45 of the frame 40. A plurality of frame members 39, 42 (FIG. 5) extend between the drive end face 46 and the non-drive end face 45 to provide structural rigidity to the frame 40 and mounting points for the various panels and systems of the generator 24.

The outer surface of the generator defines a generator housing 25 which comprises the drive end face 46 and non-drive end face 45 of the frame 40. The outer surfaces of the housing 25 between the drive end face 46 and non-drive end face 45 comprise panels 41, 48 which are removably attached to the frame 40. Environmental conditioning modules 10 are located at each corner of the frame 40, the outer surfaces of which form the corner portions of the generator housing 25.

Figure 5:
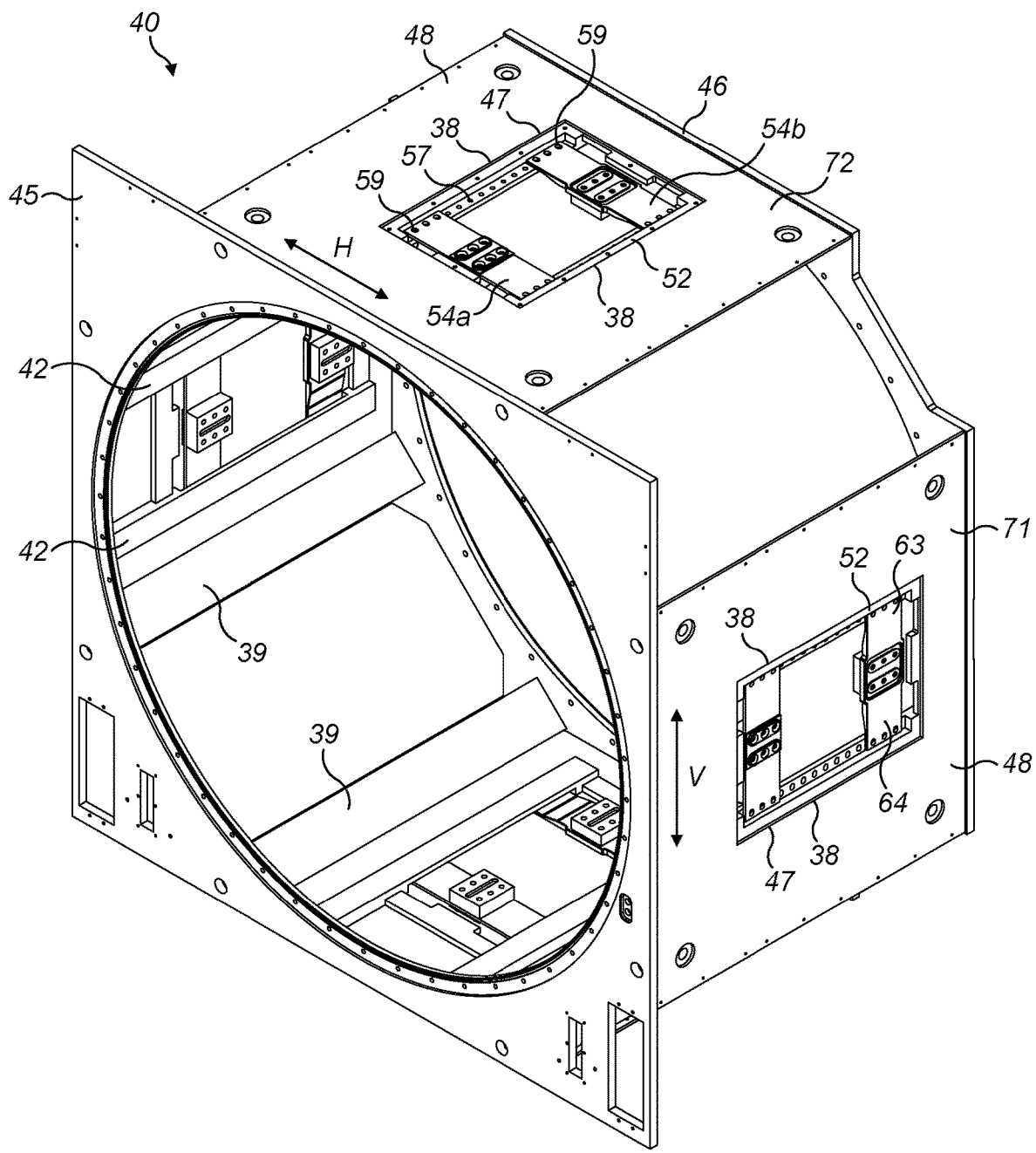
FIG. 5 is a schematic perspective view of a frame to which a stator of the generator is mounted.

Referring to FIG. 5, the panels 48 each comprise an access opening 47 which provide access to a stator mounting 'bay' 52. In this example, the stator mounting system of the generator 24 comprises four stator mounting bays 52 which are equally spaced around the circumference of the stator 36. It will be understood that any suitable amount of stator mounting bays 52 may be used and it is not essential that four stator mounting bays 52 be provided. In use, the access openings 47 are covered by an access panel 44 which is removably attached to the frame 40 by mechanical fasteners (not shown).

In this example, each stator mounting bay 52 comprises two stator mounting modules 54a, 54b. For clarity, only one stator mounting bay 52 is described in detail below.

Referring to FIG. 5, a first stator mounting module 54a is located within the bay 52 towards the non-drive end face 45 of the frame 40, and a second stator mounting module 54b is located within the bay 52 towards the drive end face 46 of the frame 40. The stator mounting modules 54a, 54b are removably and adjustably attached to axially extending members 42 of the frame 40 which extend from the drive end face 46 to the non-drive end face 45. The axially extending members 42 are located substantially at each outer axially extending edge 38 of the access openings 47 such that the opening 47 which provides access to the bay 52 comprises a reinforced opening in the housing 25. Each axially extending member 42 comprises a plurality of equally spaced bolt holes 57 for receiving fixing bolts 59.

The stator mounting modules 54a, 54b each have first and second ends 63, 64 which comprise three elongate bolt holes 73 (FIG. 4) through which the fixing bolts 59 pass. The first 63 and second 64 ends of the stator mounting modules 54a, 54b are removably and adjustably attached to the axially extending members 42 of the frame 40 by the fixing bolts 59 which pass through the elongate bolt holes 73 and engage with the bolt holes 57 in the axially extending member 42.

When the stator 36 is mounted in the frame 40 by the stator mounting system it is supported by the eight stator mounting modules 54a, 54b of the four stator mounting bays 52. Because of the accessible and flexible arrangement of the stator mounting system, it is possible to remove or adjust one or more of the stator mounting modules 54a, 54b when the generator is in situ within the nacelle 4 of the wind turbine 1. If a stator mounting module 54a, 54b needs to be replaced, repaired or adjusted, the access hatch cover 44 can be opened to provide access to the stator mounting modules 54a, 54b.

It will be understood that the embodiment described above is exemplary and that the stator 36 may be mounted to the frame 40 by any suitable number of stator mounts 54a, 54b, arranged in any suitable configuration in any suitable number of bays 52.

Figure 3:
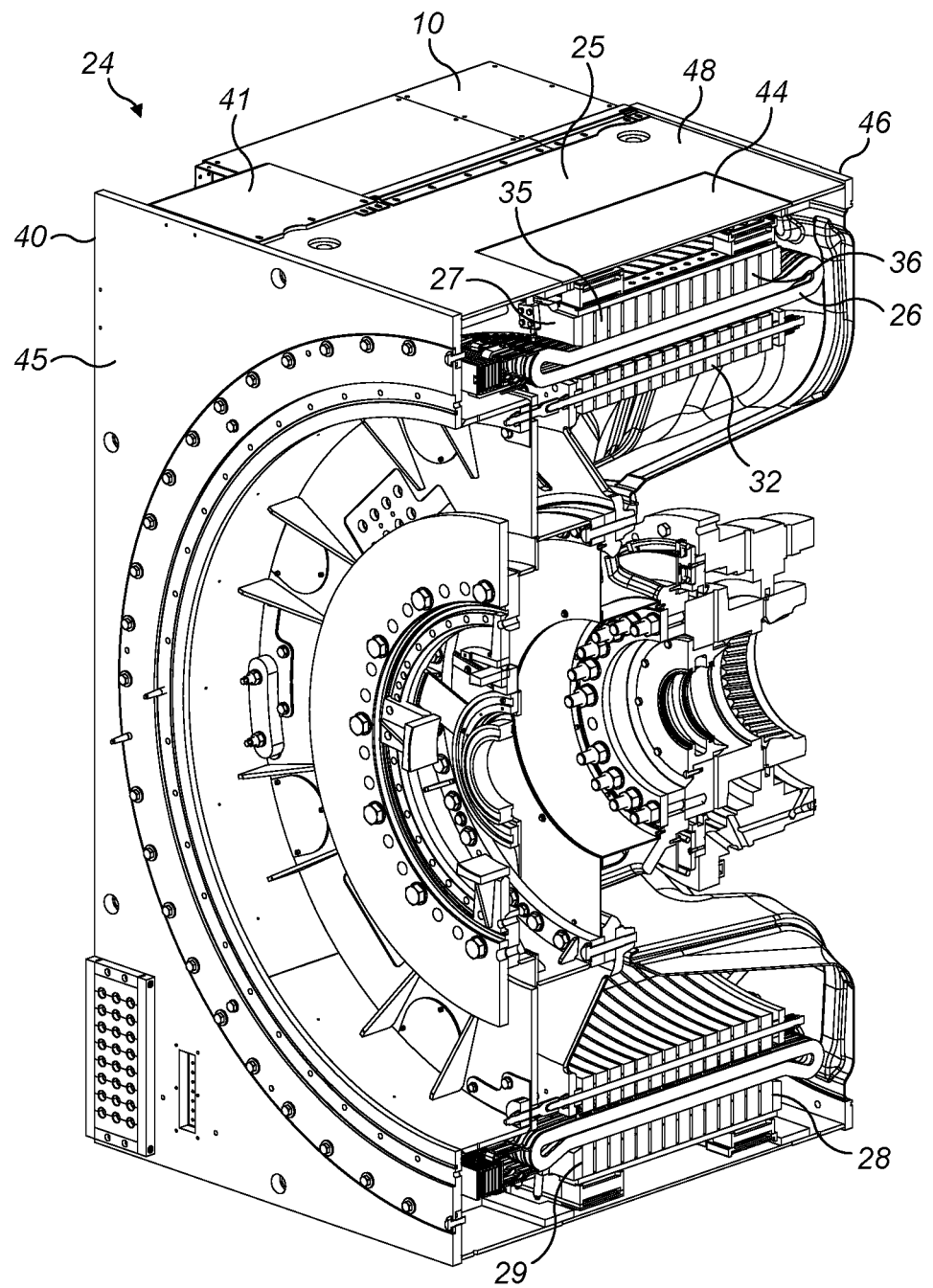
FIG. 3 is a schematic cross-sectional perspective view of a vertical plane taken through a generator of the wind turbine.
Figure 4:
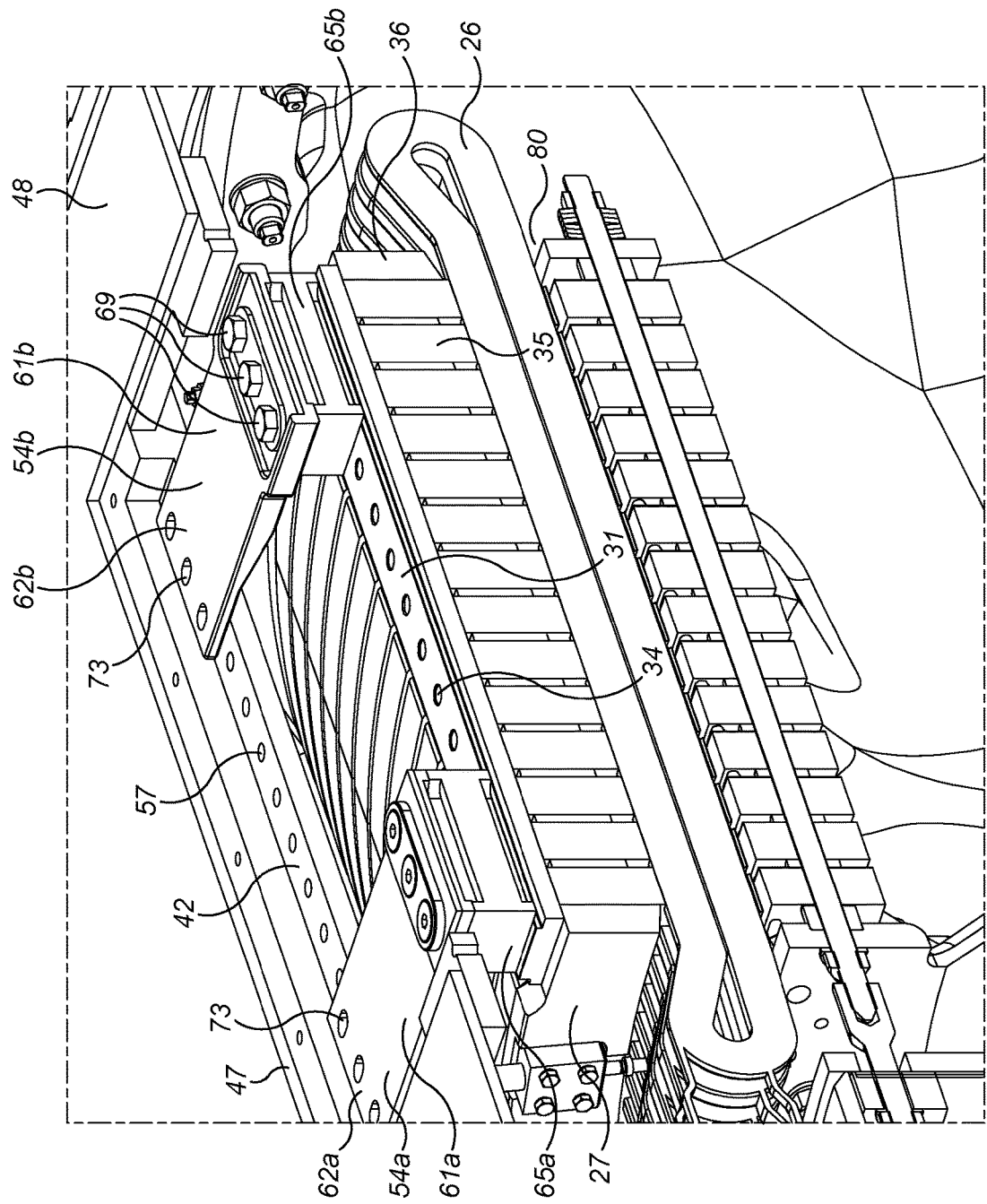
FIG. 4 is a detailed view of part of FIG. 3 focused on a stator mounting bay of the generator with part of the housing removed.

In the example embodiment of FIGS. 3 to 5, the lateral position of the stator mounting modules 54a, 54b may be finely tuned in a direction perpendicular to the central generator axis—that is, tangential to the stator 36—by loosening the fixing bolts 59 of one or more of the stator mounts 54a, 54b and moving the stator mount in a desired direction before re-tightening the fixing bolts 59. The elongate bolt holes 73 in the ends 63, 64 of the stator mounts 54a, 54b provide a degree of lateral adjustment between the stator mounts 54a, 54b and the frame 40, and also provide physical stops to limit the degree of lateral excursion possible at any one mount.

With reference to FIG. 5, if it is desired to move the stator in a vertical direction V, the fixing bolts of the stator mounts 54a, 54b on the first side 71 and second side (not shown) of the frame 40 are loosened and the stator mounts 54a, 54b are raised or lowered with respect to the frame 40 before the fixing bolts 59 are re-tightened. Similarly, if it is desired to move the stator in a horizontal direction H, the fixing bolts of the stator mounts 54a, 54b on the top 72 and bottom (not shown) of the frame 40 are loosened and the stator mounts 54a, 54b are moved horizontally with respect to the frame 40 before the fixing bolts 59 are re-tightened. Alternatively, it may be desired to adjust only the stator mounts 54a, 54b nearest to one end of the frame 40 in order to adjust the tilt or yaw of the stator 36 relative to the frame 40. The stator mounting system may be finely tuned in situ to optimise the size of the air gap 80 between the rotor 32 and the stator 36. The provision of stator mounts 54a, 54b which are separated in the axial direction of the stator is particularly beneficial as it allows for two plane adjustment. A tool may be provided for effecting adjustment of the stator mounts 54a, 54b, or the stator mounts 54a, 54b may be provided with an integral adjustment device.

Each stator mount 54a, 54b comprises a support member 62a, 62b and a mounting member 65a, 65b. The support members 62a, 62b comprise support beams 61a, 61b which are removably attached to the mounting members 65a, 65b by fixing bolts 69. The fixing bolts 69 pass through bolt holes 74 (FIG. 6a) in the beam 61a, 61b and engage with bolt holes 34 located on a mounting rail 31 of the stator 36. The support members (62a, 62b) are made from a resilient material such as, for example, steel, composite, aluminium or any other suitable material.

Figure 6A:
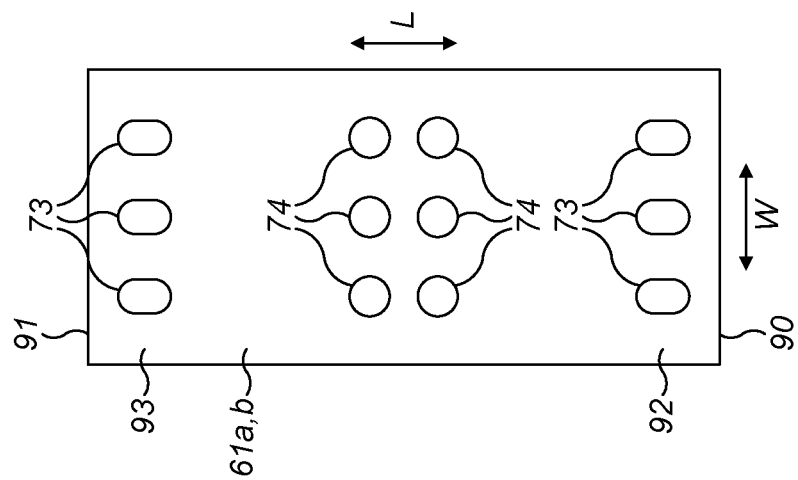
FIGS. 6a to 6c are schematic views of alternative support member configurations for the beams of the stator mounts.
Figure 6B:
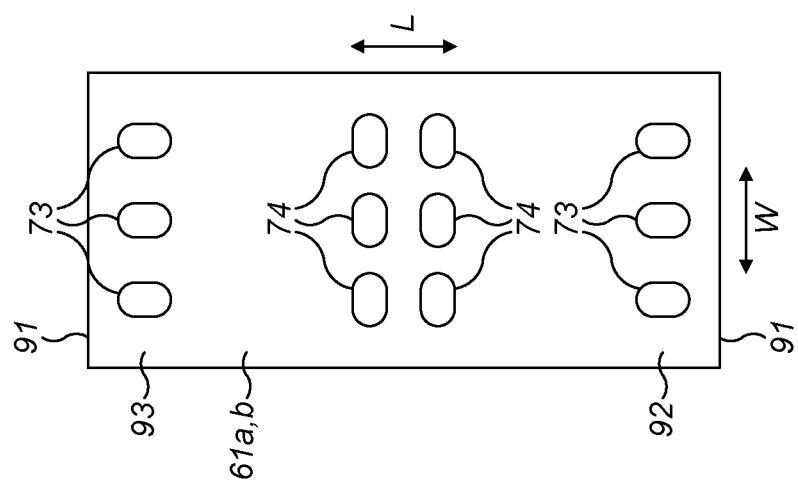
Figure 6C:
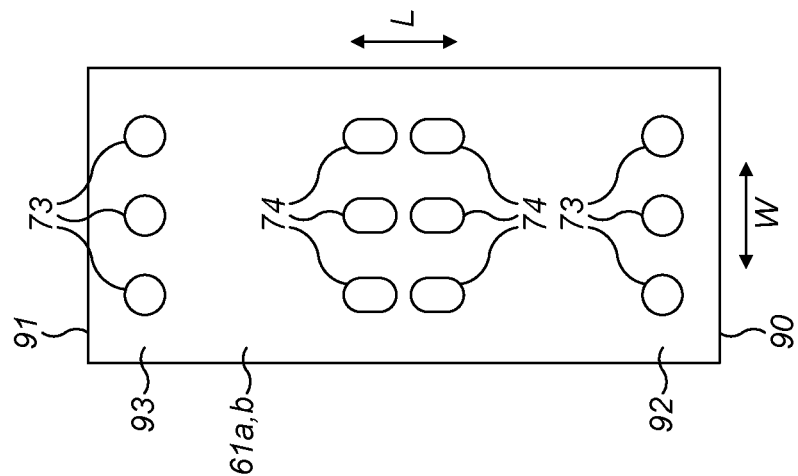

The support members 62a, 62b, shown in FIGS. 6a to 6c show alternative configurations for the bolt holes 73, 74 in the beam 61a, 61b. The beam 61a, 61b of FIG. 6a has three elongate bolt holes 73 located in a first end region 92 of the beam located proximate a first end 90 of the beam 61a, 61b, and three elongate bolt holes 73 located in a second end region 93 of the beam located proximate a second end 91 of the beam 61a, 61b. Six circular bolt holes 74 are located in two rows of three in the centre of the beam between the first 92 and second 93 end regions of the beam 61a, 61b. It will be understood that a stator mount 54a, 54b having a support member 62a, 62b of the form shown in FIG. 6a will be adjustable, in use, with respect to the frame 40 in a direction perpendicular to the central axis of the stator 36—that is, tangential to the stator 36. As described above, such a mount configuration allows for both vertical and horizontal adjustment of the stator 36 with respect to the frame 40 by adjustment of either the top and bottom mounts, or each of the side mounts, of the mounting system.

In some circumstances, it may be desirable to adjust the stator 36 in a fore/aft direction—that is, in the direction of the central axis of the stator 36. This may be achieved by providing elongate bolt holes 73 in an orthogonal direction to that shown in FIG. 6a. However, this would be at the expense of the generally more desirable horizontal/vertical adjustability. This problem may be solved by providing stator mounts 54a, 54b which have a support member 62a, 62b having a formations as shown in FIG. 6b. In this configuration, the beam 61a, 61b has three elongate bolt holes 73 located in a first end region 92 of the beam located proximate a first end 90 of the beam 61a, 61b, and three elongate bolt holes 73 located in a second end region 93 of the beam located proximate a second end 91 of the beam 61a, 61b. Each of the bolt hole 73 extend in the longitudinal direction L of the beam to provide horizontal/vertical adjustment of the stator 36 in use. Six elongate bolt holes 74 are provided in two rows of three in the centre of the beam between the first 92 and second 93 end regions of the beam 61a, 61b. The bolt holes 74 extend in a widthwise direction W across the beam 61a, 61b.

The provision of elongate bolt holes 74 that extend across the beam 61a, 61b in an orthogonal direction to the bolt holes 73 allow fore/aft adjustment of the stator 36 in use by loosening of the fixing bolts 69 that pass through the bolt holes 74 and the mounting member 65a, 65b of the mounting member 54a, 54b, adjustment of the stator 36 along its longitudinal axis, and re-tightening of the fixing bolts 69. This causes the mounting members 65a, 65b of the stator mounts to move across the with W of the beams 61a, 61b, thus effecting a fore/aft adjustment of the stator 36 with respect to the frame 40.

FIG. 6c shows a further alternative embodiment of the support member 62a, 62b of for the stator mounts 54a, 54b. In this example, the bolt holes 73 located in the first 92 and second 93 end regions of the beam 61a, 61b are circular, and the bolt hole 74 located in the centre of the beam 61a, 61b between the first 92 and second 93 end regions of the beam 61*a*, 61*b* are elongate in the longitudinal direction L of the beam 61*a*, 61*b*. Such an arrangement provides horizontal/vertical adjustability of the stator 36 in use with respect to the frame 40. Of course, any suitable arrangement of bolt holes 73, 74 may be used as desired and the possible configurations of the bolt holes 73, 74 in the beams 61*a*, 61*b* of the stator mounts 54*a*, 54*b* are not limited to those shown in FIGS. 6*a* to 6*c*. In particular, the bolt hole arrangement of FIG. 6*b* may be reversed such that the longitudinally extending bolt holes are the central bolt holes 74 and the widthwise extending bolt holes are the end region bolt holes 73.

Figure 7:
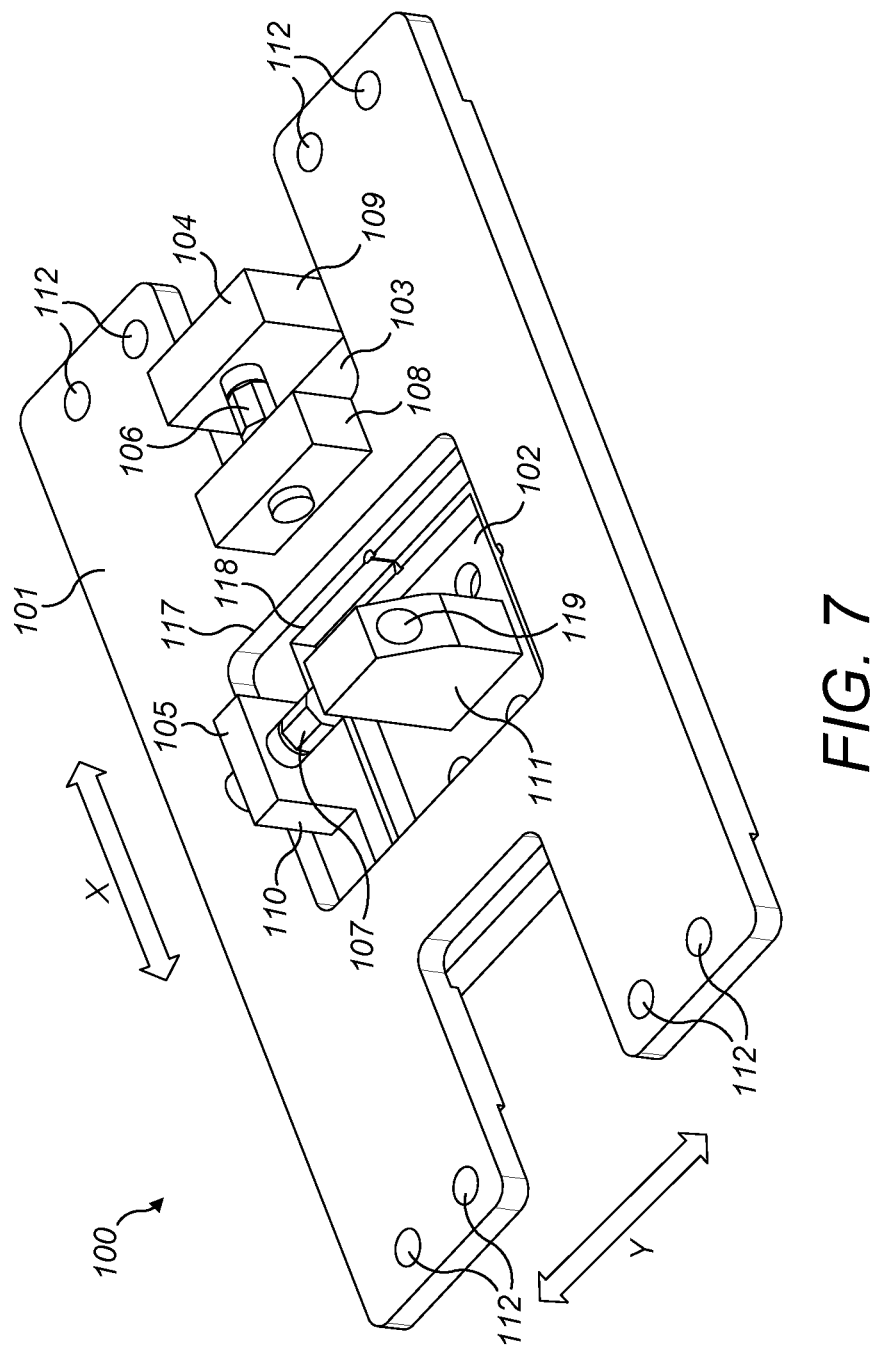
FIG. 7 is a schematic perspective view of the top side of a tool for adjusting the position of the stator mounts.

FIG. 7 shows a tool 100 for use in adjusting the stator mounts 54*a*, 54*b*. The tool 100 comprises a first element 101 which, in this example, is generally H-shaped. The first element 101 has a plurality of bolt holes 112 for attaching the tool 100 to the frame 40 of the generator 24 via fixing bolts (not shown) which pass through the bolt holes 112 and engage with the bolt holes 57 in the axially extending member 42 of the frame 40. The first element 101 also comprises a first lug 108 of a first adjustment device 104. The first lug 108 comprises a threaded bolt hole for receiving an adjustment member 106 of the first adjustment device 104.

The tool 100 comprises a second element 102 that is received within an opening 117 of the first element 101. The second element 102 comprises a plurality of bolt holes 113 for attaching the second element 102 to the mounting rail 31 of the stator 36 via fixing bolts (not shown) which pass through the bolt holes 113 and engage with the bolt holes 34 in the mounting rail 31. The second element 102 also comprises a lug 111 having a screw threaded hole 119 for receiving an adjustment member 107 of a second adjustment device 105.

Figure 8:
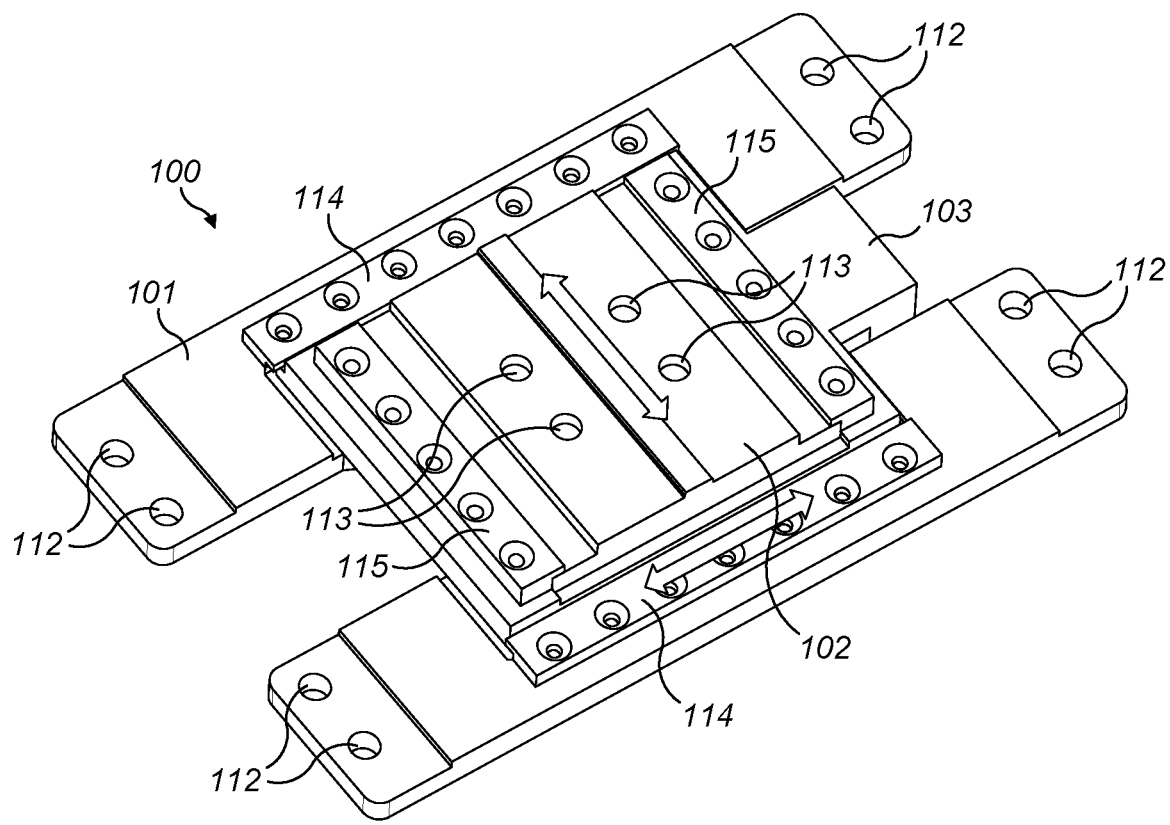
FIG. 8 is a schematic perspective view of the underside of the tool of FIG. 7.

A third element 103 is positioned between the first element 101 and the second element 102. The third element 103 is moveable with respect to the first element 101 in a first direction which corresponds to a lengthwise direction X of the tool 100. As shown in FIG. 8, the third element 103 is operatively attached to the first element 101 by a pair of rails 114.

Figure 9:
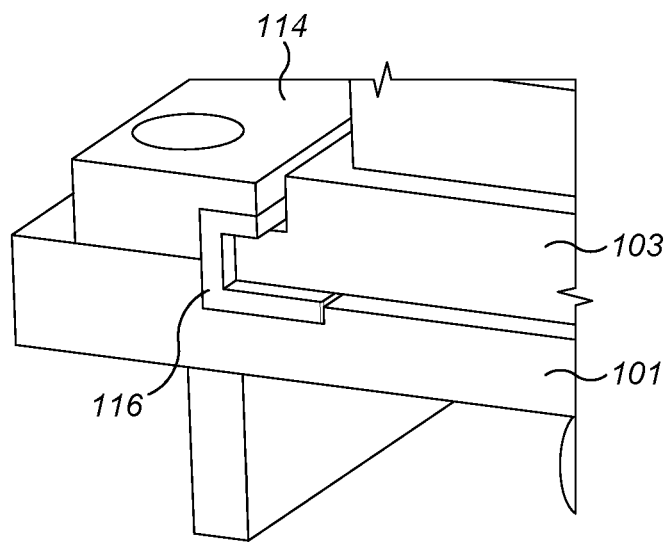
FIG. 9 is a schematic perspective view of a detail of the view of FIG. 8.

The third element 103 comprises an opening 118 for receiving the second element 102. The second element 102 is moveable with respect to the third element 103 in a second direction which corresponds to a widthwise direction Y of the tool 100. As shown in FIG. 8, the second element 102 is operatively attached to the third element 103 by a pair of rails 115. In use, movement of the third element 103 relative to the first element 101 causes a corresponding movement of the second element 102. In one example shown in FIG. 9, a composite material 116 may be provided between the rails 114, 115 and the third 103 and second 102 element respectively to decrease friction.

The third element 103 also comprises a first lug 109 having a threaded bolt hole for receiving the adjustment member 106 of the first adjustment device 104, and a second lug 110 having a threaded bolt hole for receiving the adjustment member 107 of the second adjustment device 105.

In use, the tool 100 is attached to the frame 40 of the generator 24, the fixing bolts 59, 69 of the stator mounts 54*a*, 54*b* are loosened as required for the desired adjustment of the stator 36, and the adjustment members 106, 107 are adjusted as required to cause the required positional adjustment of the stator 36. The fixing bolts 59, 69 are then re-tightened to fix the stator 36 in its adjusted position.

The tool 100 may be attached to the frame 40 before each adjustment and removed after the adjustment is complete. Alternatively, the tool 100 may remain affixed to the frame 40.

In the example above, the adjustment member 106, 107 of the adjustment devices 104, 105 comprise pulling bolts which cause relative movement of the elements 101, 102, 103 of the tool 100 depending on the direction in which the adjustment member 106, 107 is turned. In another example (not shown), one or both of the adjustment devices may be replaced by jacking bolts which abut the lugs 109, 111 of the third and second element respectively. In this example, it is desirable to provide a pair of first adjustment devices 104 on either side of the first element 101 to allow for adjustment of the third element 103 in each lengthwise direction X of the tool 100, and to provide a pair of second adjustment devices 105 on either side of the third element 103 to allow for adjustment of the second element 102 in each widthwise direction Y of the tool 100.

Figure 11:
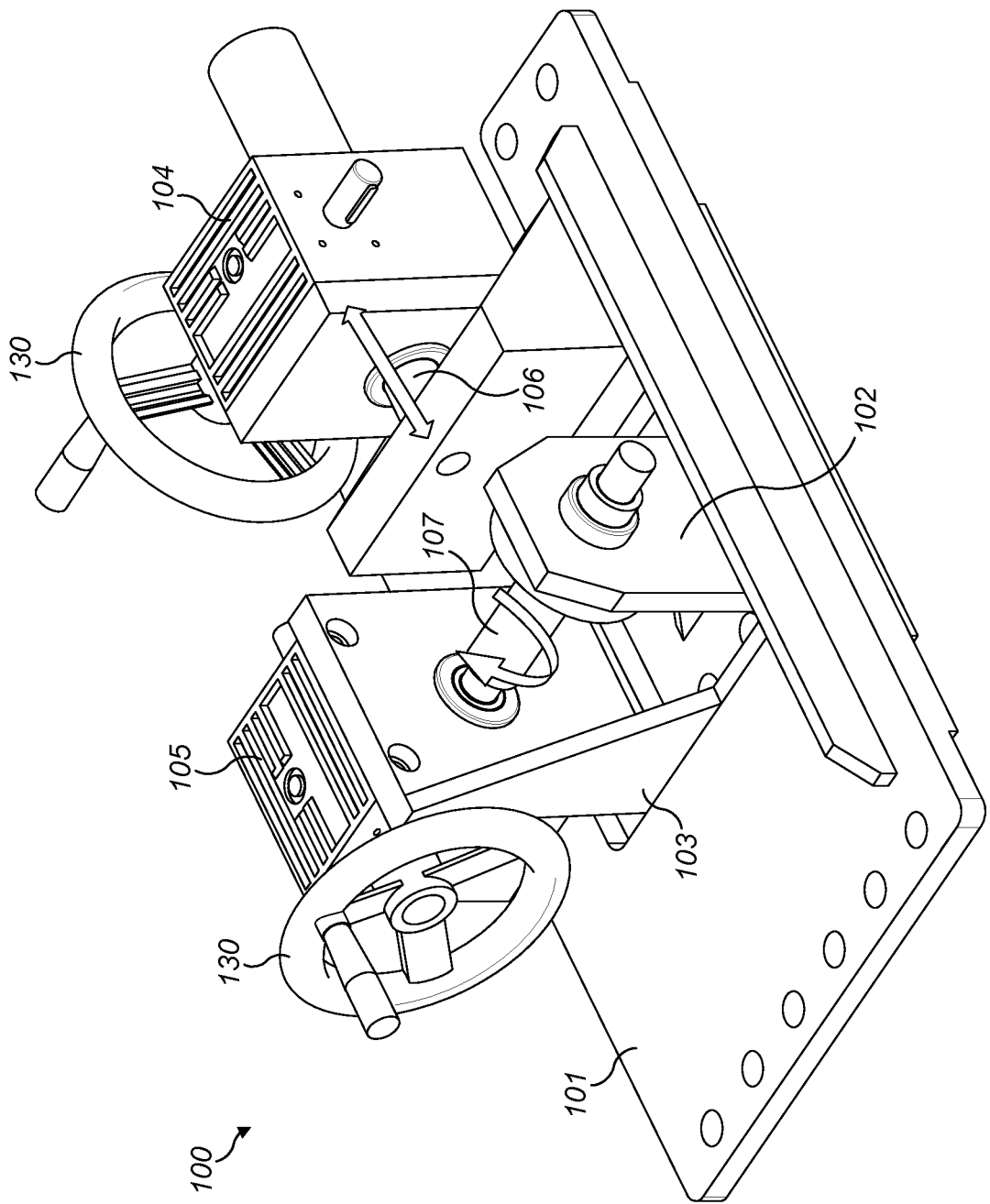
FIG. 11 is a schematic perspective view of a modified tool for adjusting the position of the stator mounts.

FIG. 11 shows an alternative tool 100 comprising first and second adjustment devices 104, 105 which comprise a handwheel 130 and gearing (not shown) for driving the adjustment members 106, 107.

Figure 12:
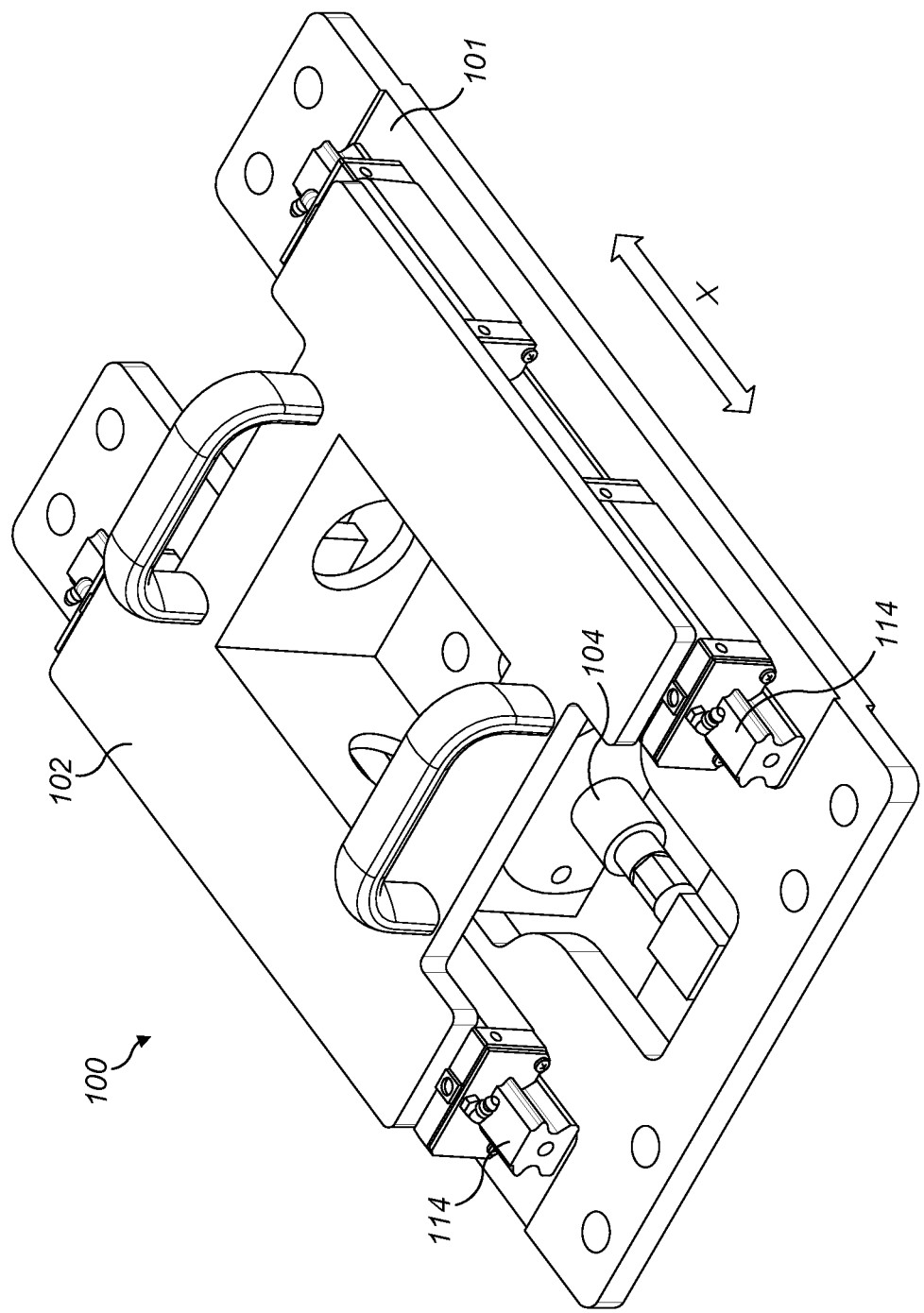
FIG. 12 is a schematic perspective view of an alternative modified tool for adjusting the position of the stator mounts.

FIG. 12 shows a tool 100 comprising a first element 101 and a second element 102 which are moveably attached to one another via pair of rails 114 such that the second element 102 is able to move relative to the first element 101 in the lengthwise direction X of the tool 100. An adjustment device 104 comprising an electric motor is provided to drive the relative movement between the first and second elements 101, 102. Because the tool 100 of FIG. 12 comprises only two elements 101, 102 moveable in the lengthwise direction X of the tool 100, the tool 100 may only be used to drive adjustments of the stator mounts 54*a*, 54*b* in a direction perpendicular to the central axis of the stator 36 (that is, tangential to the stator 36). As discussed above, stator mount adjustments of this type can be used to effect horizontal and vertical adjustment of the stator 36 with respect to the frame 40 by suitable selection of the mounts to be adjusted.

Figure 13:
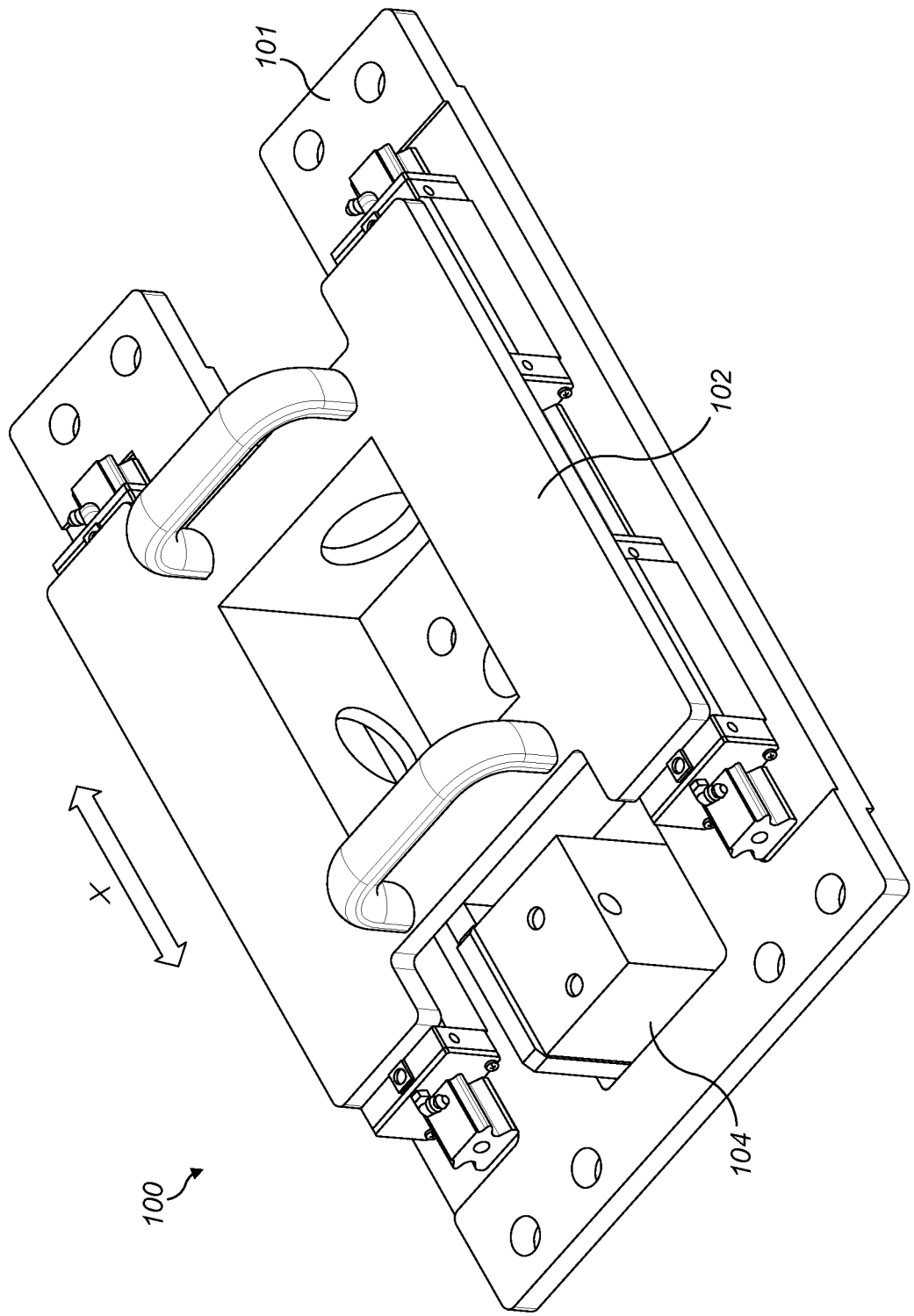
FIG. 13 is a schematic perspective view of a further alternative modified tool for adjusting the position of the stator mounts.

FIG. 13 shows an alternative tool 100 comprising a hydraulically driven adjustment device 104. It will be understood that the mechanically driven adjustment devices 104, 105 of FIG. 11 may be substituted for the electrically and/or hydraulically driven adjustment devices of FIGS. 12 and 13.

The tools 100 of FIGS. 7 to 13 are generally H-Shaped and arranged, in use, to adjust a pair of stator mounts 54*a*, 54*b* located on either side of the tool 100 at the same time. In an alternative example (not shown), the tool 100 may be narrower and arranged to be placed next to one of the stator mounts 54*a*, 54*b* to effect adjustment of that stator mount only.

Figure 14:
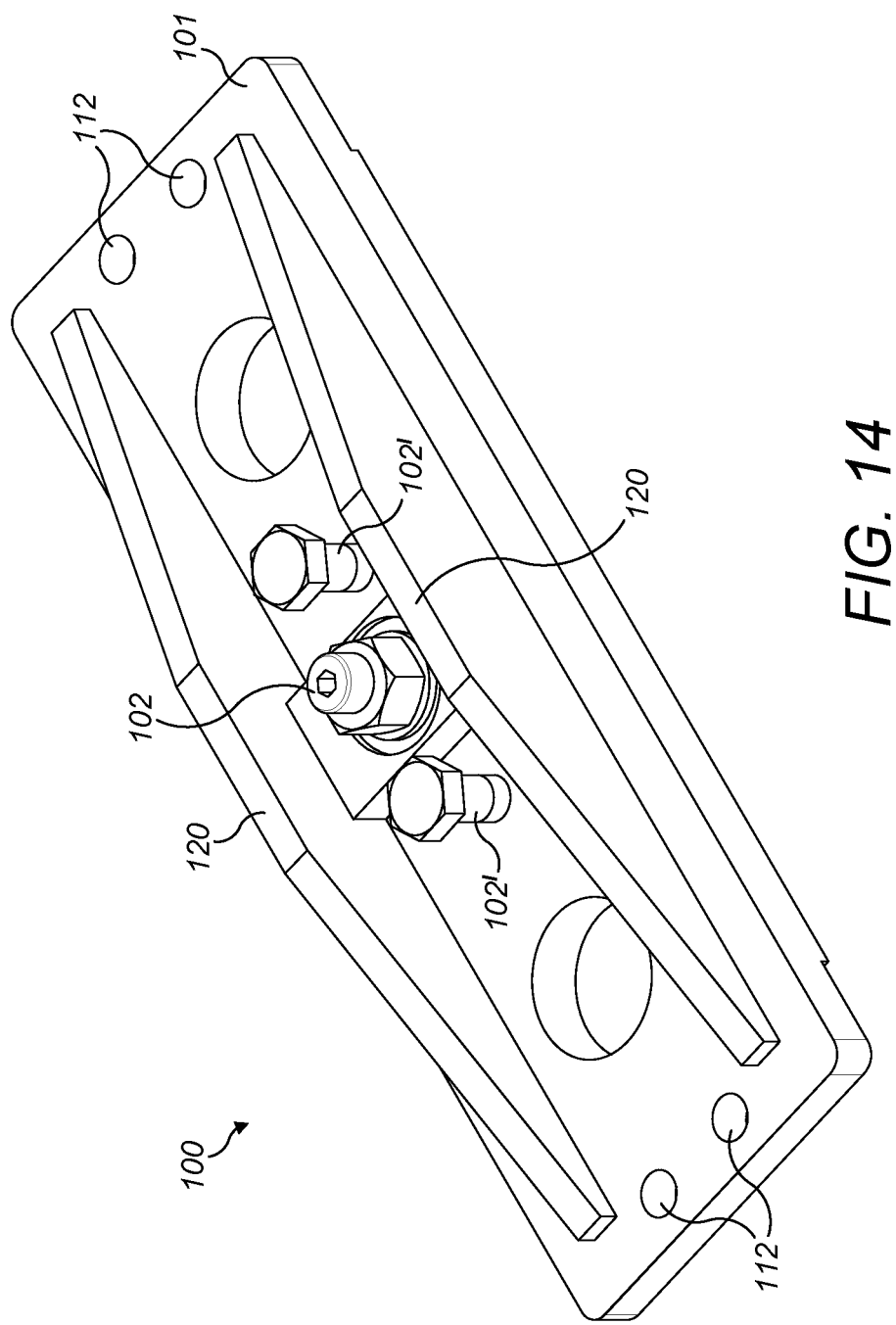
FIG. 14 is a schematic perspective view of an alternative tool for adjusting the position of the stator mounts.
Figure 15:
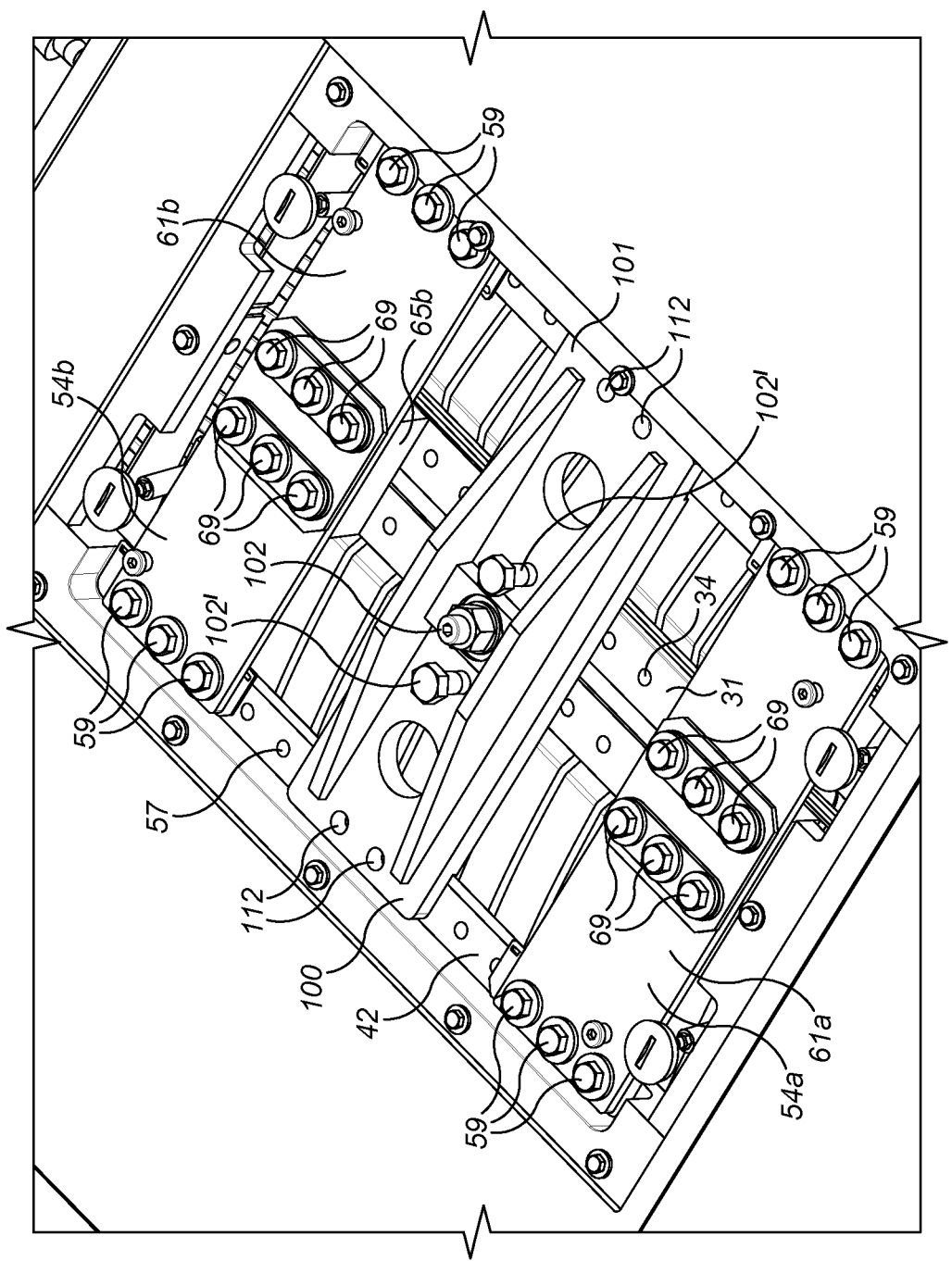
FIG. 15 is a schematic perspective view of the tool of FIG. 14 attached to the frame of a generator housing.

FIGS. 14 and 15 show a further alternative tool 100 for effecting vertical and/or horizontal adjustment of the stator 36 with respect to the frame 40. The tool 100 of FIGS. 14 and 15 comprise a first element 101 having a plurality of bolt holes 112 at each end for attachment of the tool 100 to the frame 40 of a generator 24 by fixing bolts (not shown). A pulling bolt 102 is provided substantially in the centre of the first element 101, and a pair of jacking bolts 102' are provided on either side of the pulling bolt 102. The first element 101 also comprises a pair of ribs 120 for stiffening the tool 100.

Referring to FIG. 15, the tool 100 is attached to the frame 40 of the generator 24 by means of fixing bolts (not shown) which pass through the bolt holes 112 in the ends of the tool 100 and engage with the bolt holes 57 in the axially extending members 42 of the frame 40. The tool 100 may be attached to the frame 40 prior to adjustment of the stator mount 54a, 54b positions. Alternatively, the tool 100 may be attached to the frame 40 during manufacture of the generator 24 and remain in place throughout the service life of the generator 24. The pulling bolt 102 passes through the first element 101 of the tool 100 and engages with a bolt hole (not shown) in the mounting rail 31 of the stator 36.

In use, if a vertical adjustment of the stator 36 with respect to the frame 40 is required, the appropriate fixing bolts 59/69 of the stator mounts 54a, 54b located in the bays 52 in the first 71 and second sides (FIG. 5) of the frame 40 are loosened to allow vertical adjustment of the stator 36 with respect to the frame 40. The stator mounts 54a, 54b located in the bays 52 in the top 72 and bottom sides of the frame 40 support the stator 36 during the adjustment.

To adjust the stator 36, a tool 100 located in the bay 52 at the top 72 of the frame 40 is accessed and adjusted. The pulling bolt 102 may be used to effect vertical movement of the stator in either vertical direction, and the jacking bolts 102' may be used to effect a downward vertical adjustment of the stator 36 with respect to the frame 40. In an alternative method, a tool 100 may also be located in the bay 52 at the bottom of the frame 40 and the pulling bolt 102 and jacking bolts 102' of that tool 100 may be used instead of, or together with, the tool 100 located in the bay 52 at the top 72 of the frame 40.

Similarly, if a horizontal adjustment of the stator 36 is required, the appropriate fixing bolts 59/69 of the stator mounts 54a, 54b located in the bays 52 in the top 72 and bottom sides of the frame 40 are loosened to allow horizontal adjustment of the stator 36. A Tool 100 located in one or both of the side bays 52 may then be used to adjust the position of the stator 36 while the stator mounts 54a, 54b located in the side bays 52 support the stator 36.

It will be understood that the pulling bolt 102 or jacking bolts 102' of the tool 100 may be mechanically, electrically or hydraulically driven with adjustment devices such as those describe above with reference to FIGS. 11 to 13.

If the tilt or yaw of the stator 36 needs to be adjusted with respect to the frame 40, the tool(s) 100 may be used to effect an appropriate movement of the stator 36 while appropriate ones of the fixing bolts 59/69 of a first number of stator mounts 54a, 54b remain fixed, and appropriate ones of the fixing bolts 59/69 of a second number of stator mounts 54a, 54b are loosened. It will be understood that a large variety of stator 36 adjustments may be made provided that a minimum number of stator mounts 54a, 54b—as specified by the manufacturer—remain fixed and supporting the stator 36 during the adjustment. The same is true for the tools 100 described above with respect to FIGS. 7 to 13, and for the stator mounts 54a, 54b described below with respect to FIGS. 16 to 18.

The tool 100 of FIGS. 14 and 15 is particularly useful for adjusting the vertical position of the stator 36 when the generator 24 is in situ in the nacelle 4 of a wind turbine 1. If a vertical adjustment of the stator 36 is required, a tool 100 may be positioned within the bay 52 at the top 72 of the frame 40 and the puling bolt 102 used to raise or lower the stator 36 (with the appropriate fixing bolts 59/69 loosened in the bays 52 located on the sides of the frame 40).

Figure 10:
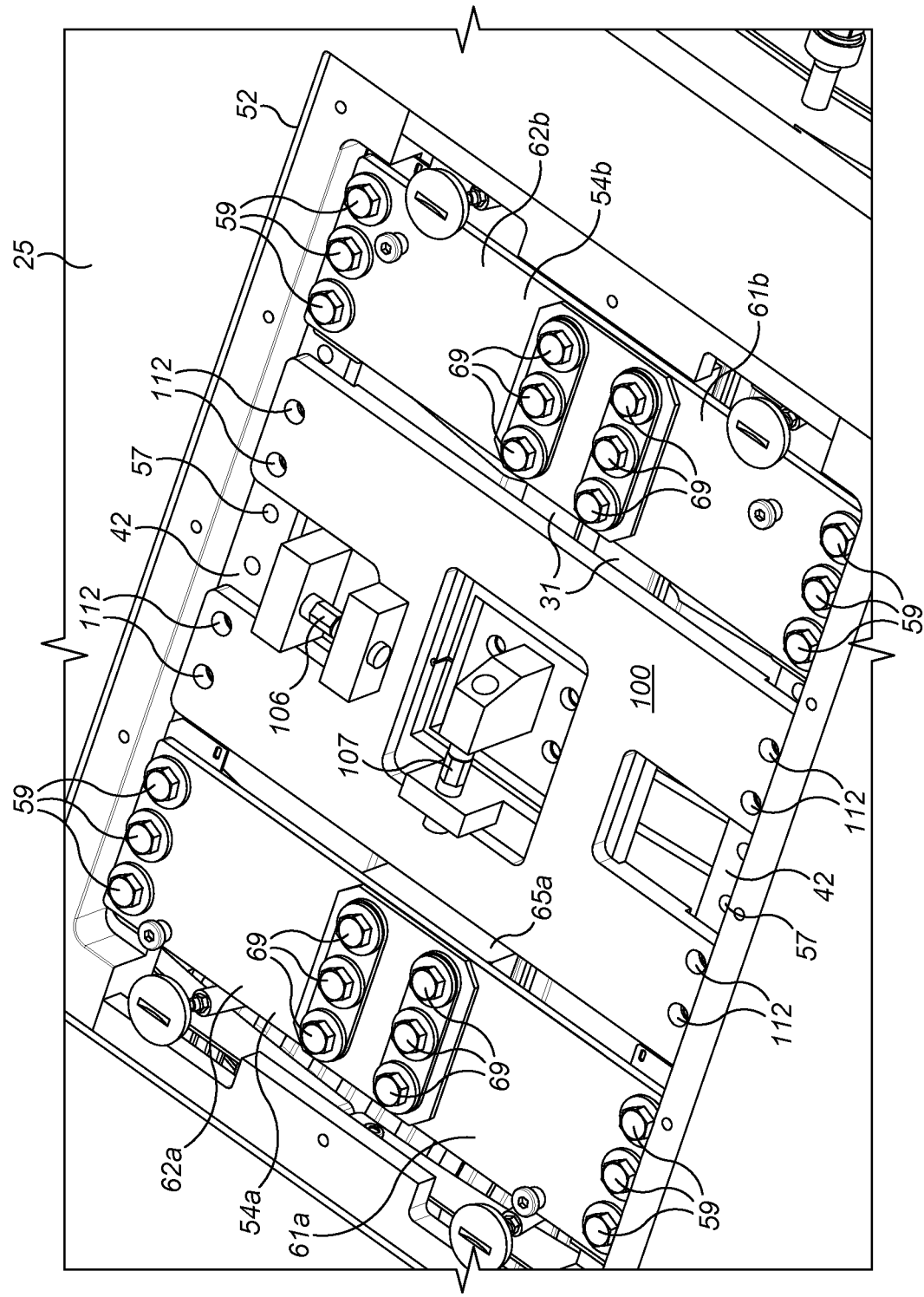
FIG. 10 is a schematic perspective view of the tool of FIG. 7 attached to the frame of a generator housing.
Figure 16:
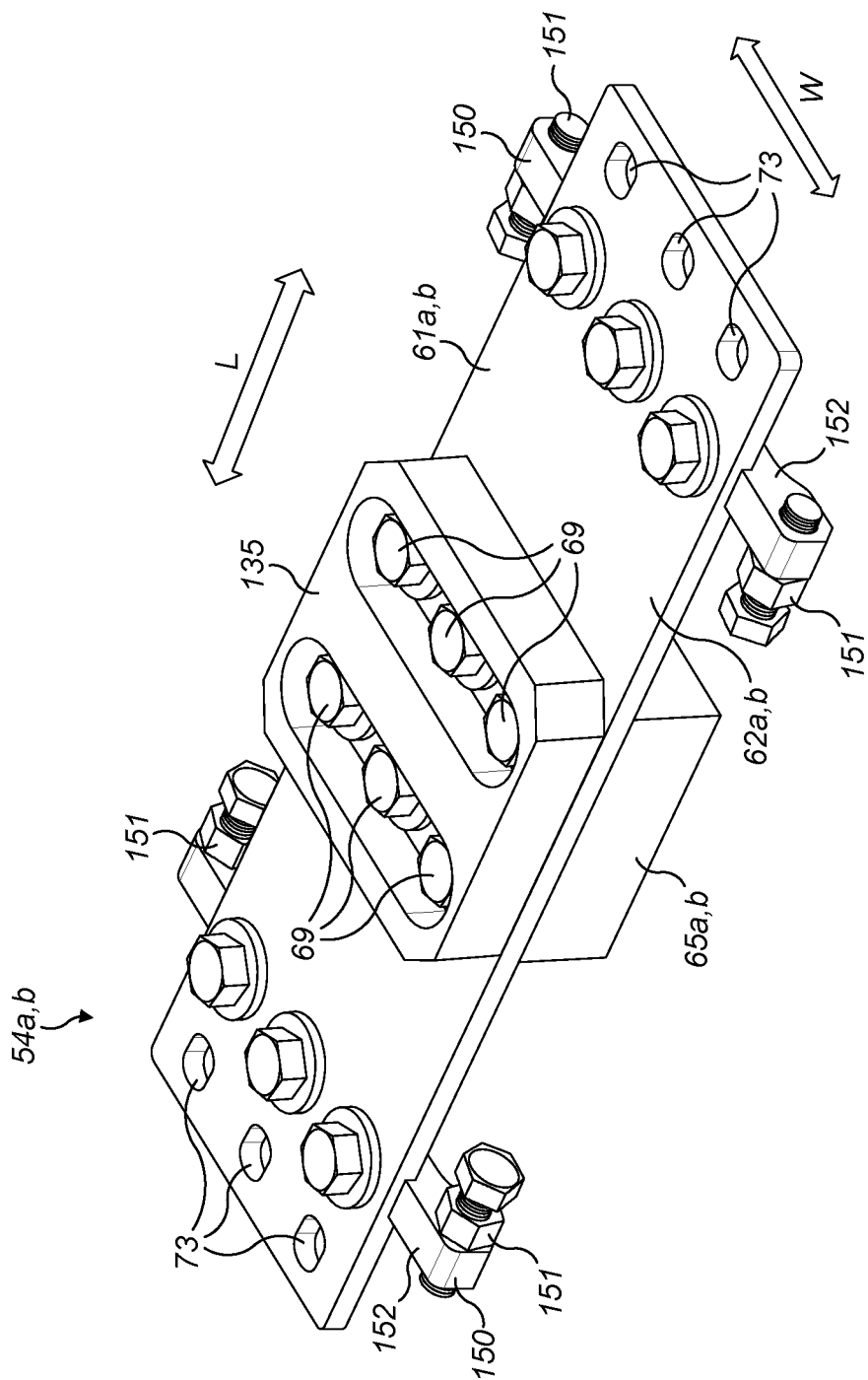
FIG. 16 is a schematic perspective view of a stator mount having an integral device for adjusting the position of the stator mount.

Referring now to FIG. 16, an alternative stator mount 54a, 54b is shown. The stator mount comprises a support member 62a, 62b and a mounting member 65a, 65b. The support member 62a, 62b comprises a support beam 61a, 61b having a plurality of elongate bolt holes 73 located at each longitudinal end for receiving fixing bolts 59 (FIG. 10). The mounting member 65a, 65b is attached to the support member 62a, 62b by a plurality of fixing bolts 69 which pass through bolt holes 74 (FIG. 6) in the beam 61a, 61b. The bolt holes 74 may be circular such that there is no provision for relative movement between the support member 62a, 62b and the mounting member 65a, 65b. Alternatively, the bolt holes 74 may be elongate in either the lengthwise L or widthwise W direction of the support member 62a, 62b to provide adjustability of the mounting member 65a, 65b with respect to the support member 62a, 62b in either the lengthwise L or widthwise W directions.

The support member 65a, 65b also comprises a pair of adjustment devices 150 for adjustment of the stator mount 54a, 54b position relative to the frame 40 of a generator 24 in use. The adjustment devices 150 are located proximate each end of the beam 61a, 61b. Each adjustment device 150 comprises a pair of adjustment members 151 and a connection member 152 for connecting the adjustment members 151 to the beam 61a, 61b. The adjustment members 151 comprise jacking bolts which are arranged for engagement with the axially extending rails 42 of the frame 40 in use. In an alternative example the jacking bolts 151 could be replaced for pulling bolts which engage with bolt holes (not shown) in the axially extending members 42 of the frame 40. If pulling bolts are used in place of the jacking bolts 151, only one adjustment device 150 need be provided. Alternatively, a combination of pulling and jacking bolts may be provided at one or both ends of the beam 61a, 61b.

The connection members 152 are attached to the beam 61a, 61b by fixing bolts 153. Alternatively, the connection members 152 may be formed integrally with the beam 61a, 61b or may be permanently attached to the beam 61a, 61b by welding, brazing, or the like.

An insulation block 135 is provided on the upper side of the support member 62a, 62b. The insulation block is made of an electrically insulating material and, in use, prevents contact between the fixing members 69 of the stator mounts 54a, 54b and the frame 40/housing 25 of the generator 24.

In use, the stator mount 54a, 54b of FIG. 16 is attached to the frame 40 and stator 36 of a generator as described above. If adjustment of the stator mount is required, fixing bolts 59 are loosened and the adjustment members 151 of the adjustment devices 150 are used to reposition the mounting member 54a, 54b with respect to the frame 40. This, in turn, causes adjustment of the stator 36 with respect to the frame 40.

Figure 17A:
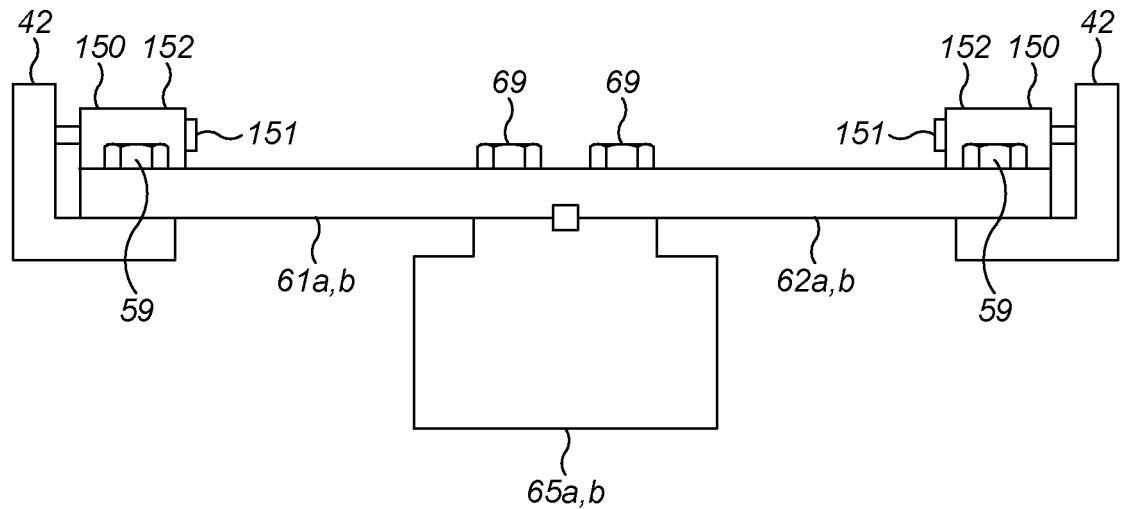
FIG. 17a is a schematic side view of an alternative stator mount having an integral device for adjusting the position of the stator mount.
Figure 17B:
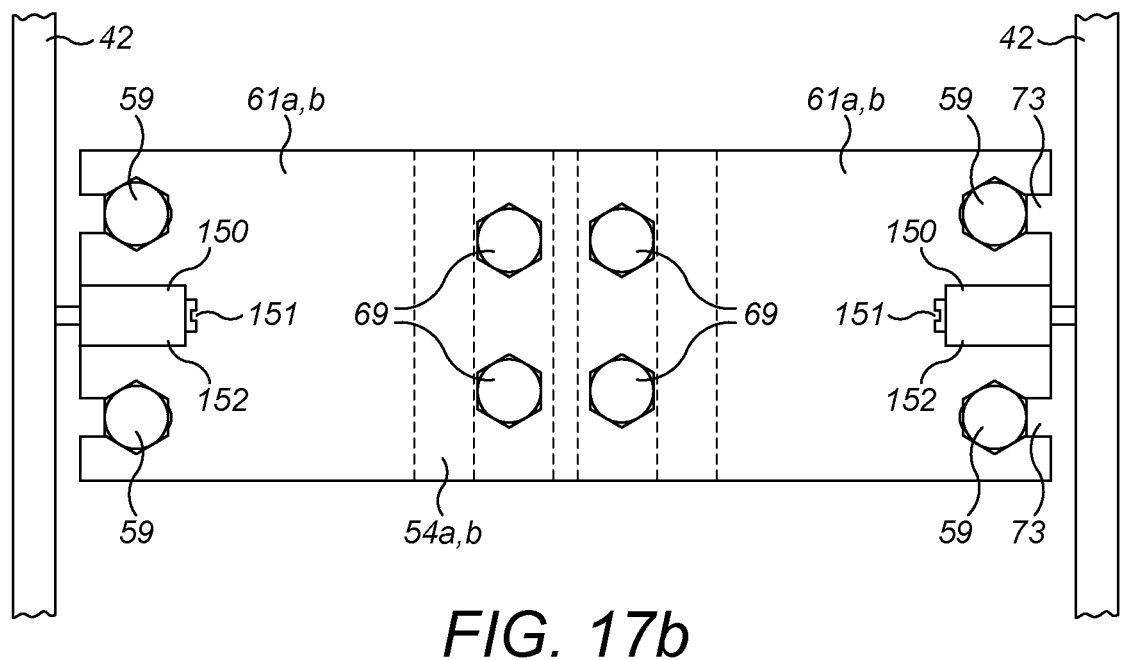

FIGS. 17a and 17b show an alternative stator mount 54a, 54b to that shown in FIG. 16. In this example, the elongate holes 73 are open ended and the adjustment devices comprise connection members 152 that are mounted on top of the support member 62a, 62b.

Figure 18:
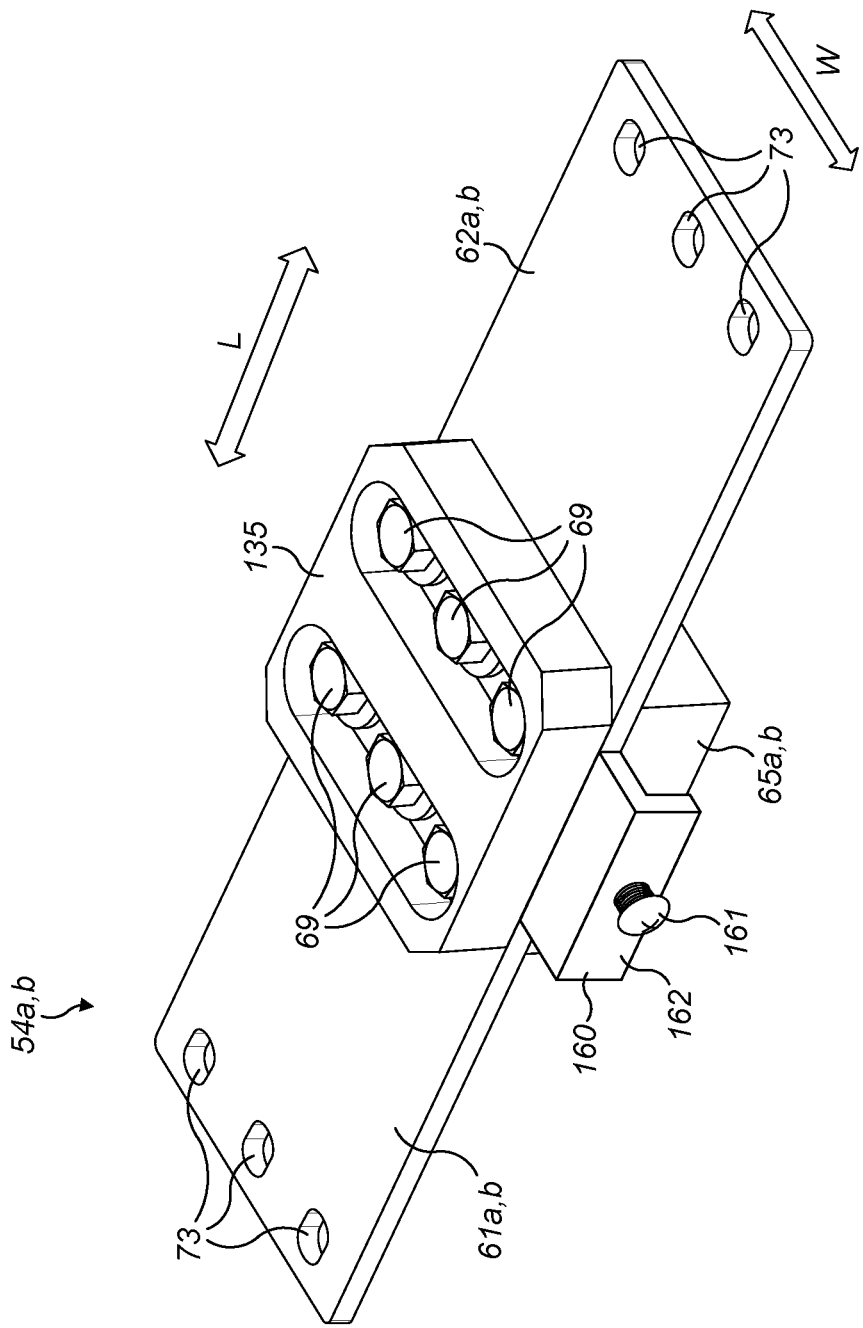
FIG. 18 is a schematic perspective view of the stator mount of FIG. 16 having an additional integral device for adjusting the position of the stator mount.

FIG. 18 shows an alternative mounting member 54a, 54b having a further adjustment device 160 for adjusting the position of the mounting member 65a, 65b with respect to the support member 62a, 62b. The adjustment device 160 comprises an adjustment member 161 and a connection member 162. The connection member 162 is connected to the support member 62a, 62b of the stator mount 54a, 54b. The adjustment member 161 is a pulling bolt which passes through a bolt hole in the connection member 162 and which engages with a bolt hole in the mounting member 65a, 65b. In use, the adjustment member 160 can be used to adjust the position of the mounting member 65a, 65b with respect to the support member 62a, 62b in the widthwise direction W of the beam 61a, 61b. In an alternative example (not shown), the adjustment member may be configured to effect a lengthwise L relative movement between the mounting member 65a, 65b and the support member 62a, 62b. In this case, the bolt holes 74 (FIG. 6) in the beam 61a, 61b would need to extend in the lengthwise L direction of the beam 61a, 61b.

It will be understood that there are many possible arrangements of stator mounts 54a, 54b, beam openings 73, 74 and tools 100.

The invention claimed is:

1. A stator mount for mounting a stator of a generator to a frame of the generator, the stator mount comprising:
   a support member; and
   a mounting member removably attached to the support member,
   wherein the support member comprises:
      a beam having a first end and a second end;
      a first plurality of openings located in a first end region of the beam proximate the first end of the beam;
      a second plurality of openings located in a second end region of the beam proximate the second end of the beam;
      a third plurality of openings located between the first and second end regions of the beam, wherein either at least the first and second plurality of openings have an elongate form, or at least the third plurality of openings have an elongate form; and
      a position adjustment device for adjusting the position of the stator of the generator relative to the frame of the generator in use,
      wherein the position adjustment device comprises an adjustable member configured for movement with respect to the support member and configured for engagement with the frame of the generator in use, and
      wherein the adjustment device is configured so that, in use, movement of the adjustable member relative to the support member causes relative movement between the support member and the frame of the generator.

2. The stator mount as claimed in claim 1, wherein the adjustment device comprises a connection member, wherein the connection member is configured to operatively connect the adjustable member and the support member.

3. The stator mount as claimed in claim 1, wherein the support member comprises a first adjustment device located proximate the first end of the beam, and a second adjustment device located proximate the second end of the beam.

4. A generator for a wind turbine, the generator comprising a stator which defines a central axis of the generator, the stator being mounted within a frame by a stator mounting system, wherein the stator mounting system comprises a plurality of stator mounts as claimed in claim 1, each stator mount being removably attached to the stator and removably attached to the frame, wherein the stator mounting system is arranged so that the position of one or more of the stator mounts is adjustable with respect to the frame with the stator mounted in situ within the frame.

5. A method of adjusting the position of the stator of the generator according to claim 4 with respect to the frame of the generator when the stator is mounted in-situ within the frame, the method comprising:
   loosening a first plurality of fasteners, wherein the first plurality of fasteners is associated with one or more of the first plurality of openings, the second plurality of openings, or the third plurality of openings of the support member of the stator mount;
   moving the adjustable member of the adjustment device of the stator mount to cause relative movement between the stator and the frame of the generator; and
   tightening the first plurality of fasteners.

6. The method as claimed in claim 5, comprising loosening a second plurality of fasteners before movement of the adjustable member, wherein the first plurality of fasteners is associated with the first plurality of openings, and the second plurality of fasteners is associated with the second plurality of openings; and
   tightening the second plurality of fasteners.

7. The method as claimed in claim 5, wherein the first plurality of fasteners is associated with the third plurality of openings.

8. The generator as claimed in claim 4, wherein the generator comprises a tool attached to the frame of the generator.

9. A wind turbine comprising a generator according to claim 4.

10. A tool for adjusting the position of a stator of a generator when the stator is mounted, in-situ, within a frame of the generator, the tool comprising:
    a first element configured for removable attachment to the frame of the generator; and
    a second element configured for engagement with the stator of the generator,
    wherein the first element and the second element are arranged such that a portion of the second element extends through an opening in the first element;
    wherein the second element is moveable with respect to the first element, and
    wherein the tool is configured so that, in use, when the first element is attached to the frame of the generator and the second element is in engagement with the stator of the generator, movement of the second element relative to the first element causes movement of the stator with respect to the frame.

11. The tool as claimed in claim 10, wherein the second element is configured to abut the stator in use.

12. The tool as claimed in claim 10, wherein the second element is configured for removable attachment to the stator in use.

13. The tool as claimed in claim 12, comprising a third element, wherein the third element is moveable relative to the first element in a first direction, and moveable relative to the second element in a second direction, wherein the tool is configured so that, in use, movement of the third element relative to the first element in the first direction causes movement of the stator along the first direction, and movement of the third element relative to the second element in the second direction causes movement of the stator along the second direction.

14. The tool as claimed in claim 13, comprising a first adjustment device and a second adjustment device, wherein:
    the first adjustment device comprises a first adjustment member in operative engagement with the first element and the third element, wherein the first adjustment device is configured so that, in use, adjustment of the first adjustment member causes relative movement between the first element and the third element in the first direction; and
    the second adjustment device comprises a second adjustment member in operative engagement with the third element and the second element, wherein the second adjustment device is configured so that, in use, adjustment of the second adjustment member causes relative movement between the third element and the second element in the second direction.

15. The tool as claimed in claim 14, wherein the first and/or second adjustment member is a pulling bolt or a jacking bolt.

16. The tool as claimed in claim 14, wherein the first and/or second adjustment member is actuated by a mechanical handle, a hydraulic actuator or an electrical actuator.

17. The tool as claimed in claim 13, wherein the third element is constrained to slide relative to the first element by a first pair of rails.

18. The tool as claimed in claim 13, wherein the third element is constrained to slide relative to the second element by a second pair of rails.

19. A method of adjusting the position of the stator of a generator with respect to the frame of the generator when the stator is mounted in-situ within the frame, wherein the stator is mounted within the frame by a stator mounting system including a plurality of stator mounts, each stator mount comprising:
  a support member; and
  a mounting member removably attached to the support member,
  wherein the support member comprises:
    a beam having a first end and a second end;
    a first plurality of openings located in a first end region of the beam proximate the first end of the beam;
    a second plurality of openings located in a second end region of the beam proximate the second end of the beam; and
    a third plurality of openings located between the first and second end regions of the beam, wherein either at least the first and second plurality of openings have an elongate form, or at least the third plurality of openings have an elongate form,
  wherein each stator mount is removably attached to the stator and removably attached to the frame, and
  wherein the method comprises:
    providing a tool, wherein the tool is attached to the frame of the generator, or wherein the method comprises the step of attaching the tool to the frame of the generator;
    loosening a plurality of fasteners, wherein the plurality of fasteners is associated with one or more of the first plurality of openings, the second plurality of openings, or the third plurality of openings of the support member of a stator mount;
    moving the adjustable member of an adjustment device of the tool to cause relative movement between the stator and the frame of the generator; and
    tightening the plurality of fasteners.

* * * * *